(12) United States Patent
Ott et al.

(10) Patent No.: US 10,877,983 B2
(45) Date of Patent: Dec. 29, 2020

(54) SYSTEM AND METHOD OF DATA MANAGEMENT AND COMPARISON

(71) Applicant: Anthem Entertainment (GP) Inc., Toronto (CA)

(72) Inventors: Robert Ott, Toronto (CA); Christopher Giansante, Etobicoke (CA)

(73) Assignee: Anthem Entertainment (GP) Inc., Toronto (CA)

( * ) Notice: Subject to any disclaimer, the term of this patent is extended or adjusted under 35 U.S.C. 154(b) by 167 days.

(21) Appl. No.: 16/263,747

(22) Filed: Jan. 31, 2019

(65) Prior Publication Data

US 2019/0236069 A1  Aug. 1, 2019

Related U.S. Application Data

(60) Provisional application No. 62/624,495, filed on Jan. 31, 2018.

(51) Int. Cl.

| G06F 16/00 | (2019.01) |
|---|---|
| G06F 16/2458 | (2019.01) |
| G06F 16/2457 | (2019.01) |
| G06F 16/248 | (2019.01) |
| G06N 7/02 | (2006.01) |

(52) U.S. Cl.
CPC ........ *G06F 16/2468* (2019.01); *G06F 16/248* (2019.01); *G06F 16/24575* (2019.01); *G06N 7/02* (2013.01)

(58) Field of Classification Search
CPC .......... G06F 16/2468; G06F 16/24575; G06F 16/248; G06N 7/02
See application file for complete search history.

(56) References Cited

U.S. PATENT DOCUMENTS

| 6,636,867 | B2 | 10/2003 | Robertson |
|---|---|---|---|
| 7,725,421 | B1 | 5/2010 | Gedalius et al. |
| 8,260,713 | B2 | 9/2012 | Holcombe |
| 8,712,825 | B1 | 4/2014 | Holcombe et al. |
| 9,336,360 | B1 | 5/2016 | Ahdritz et al. |
| D773,490 | S | 12/2016 | Ahdritz et al. |

(Continued)

OTHER PUBLICATIONS

Document relating to co-pending U.S. Appl. No. 16/006,515, dated Sep. 10, 2020 (Office Action), 28 pages.

(Continued)

*Primary Examiner* — Diedra McQuitery
(74) *Attorney, Agent, or Firm* — Bereskin & Parr LLP/S.E.N.C.R.L., s.r.l.

(57) ABSTRACT

A system and method can be provided to facilitate the comparison of different data sets associated with different organizations. A first data set belonging to a first organization and a second data set belonging to a second organization can be provided. Permissions can be set such that users associated with the first organization cannot view the data contained in the second data set and vice versa. The data sets can be compared based on selected data categories to generate a third data set of match results. The comparison can comprise the use of fuzzy logic. Unmatched data can be excluded from the third data set to protect sensitive data of each organization. The third data set can then be shared between the first and second organization.

6 Claims, 32 Drawing Sheets

(56) References Cited

U.S. PATENT DOCUMENTS

| | | | |
|---|---|---|---|
| D773,491 S | 12/2016 | Ahdritz et al. | |
| D773,492 S | 12/2016 | Ahdritz et al. | |
| 10,319,040 B1 | 6/2019 | Ahdritz et al. | |
| 10,437,440 B2* | 10/2019 | Kim | G06F 3/0482 |
| 10,497,071 B2* | 12/2019 | Gosink | G06Q 50/06 |
| 2006/0167807 A1 | 7/2006 | Aydar et al. | |
| 2007/0156607 A1 | 7/2007 | Miloslaysky et al. | |
| 2007/0208669 A1 | 9/2007 | Rivette et al. | |
| 2008/0301058 A1 | 12/2008 | Campbell et al. | |
| 2009/0234826 A1* | 9/2009 | Bidlack | G06F 16/215 |
| 2010/0030607 A1 | 2/2010 | Holcombe et al. | |
| 2010/0161499 A1 | 6/2010 | Holcombe et al. | |
| 2011/0015968 A1 | 1/2011 | Carlson | |
| 2011/0099084 A1 | 4/2011 | Horn et al. | |
| 2012/0197785 A1 | 8/2012 | Cooper et al. | |
| 2015/0269390 A1* | 9/2015 | Schaefer | G06F 21/6218 707/781 |
| 2015/0287153 A1 | 10/2015 | Kankanala et al. | |
| 2016/0275519 A1 | 9/2016 | Miyase | |
| 2018/0357734 A1 | 12/2018 | Ott et al. | |
| 2019/0325329 A1* | 10/2019 | Rais-Ghasem | G06F 16/367 |

OTHER PUBLICATIONS

Rouse, Margaret, "Parallel Processing Definition," SearchDataCenter, archived on Jan. 2, 2016, available at: <https:// web.archive.org/web/20160102210428/https://searchdatacentertechtarget.conn/definition/parallel-processing > (Year: 2016), 6 pages.

* cited by examiner

FIG. 22

SYSTEM AND METHOD OF DATA MANAGEMENT AND COMPARISON

CROSS-REFERENCE TO RELATED APPLICATIONS

This application claims the benefit of U.S. Provisional Patent Application No. 62/624,495, filed Jan. 31, 2018, the entire contents of which is incorporated herein by reference.

FIELD

The present disclosure is related to the field of data management, in particular, the management, comparison and restriction of data between different data sets.

INTRODUCTION

Throughout the world, data is stored in different databases. Different organizations can organize the same or similar data in any number of different ways. While it can be desirable to be able to compare and match the data in different databases or data sets, this can be impeded by concerns regarding privacy and security between the different owners of the data. Also, different classifications for the same data can make it difficult to compare data between different databases or data sets.

SUMMARY

The various embodiments described herein generally relate to systems and methods for comparing and finding matches in disparate data sets while preserving privacy and security of information within the submitted data sets.

In accordance with at least some embodiments, systems and methods are provided to facilitate the comparison of different data sets associated with different organizations. A first data set belonging to a first organization and a second data set belonging to a second organization can be provided. Permissions can be set such that users associated with the first organization cannot view the data contained in the second data set and vice versa. The data sets can be compared based on selected data categories to generate a third data set of match results. The comparison can comprise the use of fuzzy logic. Unmatched data can be excluded from the third data set to protect sensitive data of each organization. The third data set can then be shared between the first and second organization.

The methods and systems described herein are generally described in relation to an embodiment where a collective society can compile data related to intellectual property assets for which it has collected royalties but which are not registered with the collective society. This data can be referred to as a pending list, as the collective society does not know who the rights holders of these intellectual property assets are, it is, therefore, unable to pay the associated royalties to the rights holders. Intellectual property rights managers, referred to herein as the Catalog Owner, can maintain a catalog database regarding the rights holders of various intellectual property assets. The catalog database and the pending list can store the data in a different format which can make a direct comparison of the data difficult. The systems and methods described herein can permit matching of data between a pending list and a catalog database while maintaining privacy and security of each party's data. While described in the context of data matching and sharing between collective societies and catalog owners, as known to one skilled in the art, the systems and methods described herein can be applied to any embodiment where two or more parties desire to hare and compare data while maintaining some privacy and security over the data.

Broadly stated, in at least some embodiments a method can be provided for managing data comparison and sharing, the method can comprise the steps of: receiving at least one first data set, each first data set comprising at least one first data category, the first data set being associated with a first organization, the first organization associated with at least one first user: assigning a name to each of the at least one first data category of each first data set: receiving at least one second data set. each second data set comprising at least one second data category, the second data set being associated with a second organization the second organization associated with at least one second user; assigning a name to each of the at least one second data category of each second data set; restricting access to the at least one first data set to the at least one first user and restricting access to the at least one second data set to the at least one second user; selecting at least one first data category and selecting at least one second data category: comparing the at least one first data set with the at least one second data set based on the selected at least one first data category and the selected at least one second data category, the comparison using fuzzy logic; generating at least one third data set comprising results of the comparison of the at least one first data set with the at least one second data set based on the selected at least one first data category and the selected at least one second data category; and sharing the at least one third data set with at least one of the at least one first user or the at least one second user.

Broadly stated, in at least some embodiments, unmatched data from the comparison of the at least one first data set with the at least one second data set based on the selected at least one first data category and the selected at least one second data category step can be excluded from the at least one third data set.

Broadly stated, in at least some embodiments, the method can further comprise the step of comparing a subset of the at least one first data set with a subset of the at least one second data set based on the selected at least one first data category and the selected at least one second data category using fuzzy logic.

Broadly stated, in at least some embodiments, a system can be provided for managing data comparison and sharing, the system can comprise: a computing device configured to: receive at least one first data set, each first data set comprising at least one first data category. the first data set being associated with a first organization, the first organization associated with at least one first user; assign a name to each of the at least one first data category of each first data set; receive at least one second data set, each second data set comprising at least one second data category, the second data set being associated with a second organization the second organization associated with at least one second user; assign a name to each of the at least one second data category of each second data set; restrict access to the at least one first data set to the at least one first user and restricting access to the at least one second data set to the at least one second user; select at least one first data category and selecting at least one second data category; compare the at least one first data set with the at least one second data set based on the selected at least one first data category and the selected at least one second data category, the comparison using fuzzy logic; generate at least one third data set comprising results of the comparison of the at least one first data set with the at least one second data set based on the selected at least one first data category and the selected at least one second data category; and share the at least one third data set with at least one of the at least one first user or the at least one second user.

Broadly stated, in at least some embodiments, unmatched data from the comparison of the at least one first data set with the at least one second data set based on the selected at least one first data category and the selected at least one second data category step can be excluded from the at least one third data set.

Broadly stated, in at least some embodiments, the computing device can be further configured to compare a subset of the at least one first data set with a subset of the at least one second data set based on the selected at least one first data category and the selected at least one second data category using fuzzy logic.

DRAWINGS

Several embodiments will now be described in detail with reference to the drawings, in which:

FIG. 22 is an example jobs interface according to the embodiment of the system and method for data comparison and sharing of FIG. 17;

Figure 1:
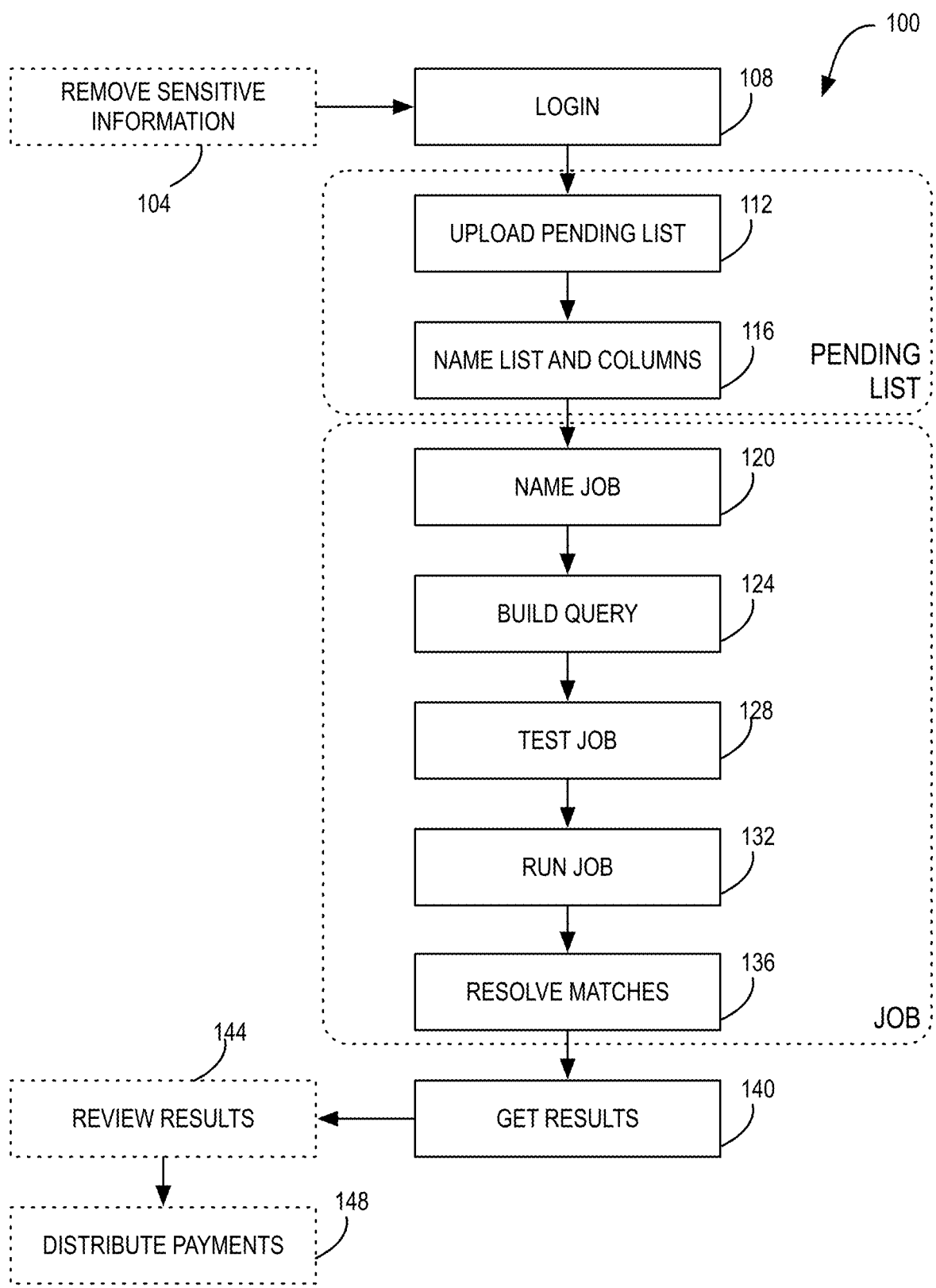
FIG. 1 is a process flow diagram depicting an overview of an embodiment of the system and method for data comparison and sharing.

The drawings, described further below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF VARIOUS EMBODIMENTS

As described above, different organizations can organize the same or similar data in any number of different ways. While it can be desirable to be able to compare and match the data in different databases or data sets, this can be impeded by concerns regarding privacy and security between the different owners of the data. Also, different classifications for the same data can make it difficult to compare data between different databases or data sets.

As an example, in most jurisdictions around the world, collective societies collect royalty payments from parties who want to use a particular intellectual property asset, and pass the royalties on to the rights holder or a rights manager for distribution to the appropriate rights holders. The collective societies may collect royalties that are not properly matched to intellectual property assets registered with the collective society. These assets are typically included in a pending royalties list. The list is not disclosed to the public, though a rights holder can submit their assets to a collective society and receive any unpaid royalties associated therewith. This can be labour intensive when requests must be submitted to a number of collective agencies around the world. Collective agencies can confidentially release the unclaimed royalties list to rights managers which can then claim the royalties for any assets under their management. However, once again as each collective agency may use a unique format for the unclaimed royalty list, this can be a time consuming process.

The various embodiments described herein generally relate to systems and methods for comparing and finding matches in disparate data sets while preserving privacy and security of information within the submitted data sets.

In this description, references to "one embodiment", "an embodiment", or "embodiments" mean that the feature or features being referred to are included in at least one embodiment of the technology. Separate references to "one embodiment", 'an embodiment', or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the present technology can include a variety of combinations and/or integrations of the embodiments described herein.

As will be appreciated by one skilled in the art, the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium may include the following: an electrical connection having one or more wires, a portable computer diskette, a hard disk, a random-access memory (RAM), a read-only memory (ROM). an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electromagnetic, optical, or any suitable combination thereof, A computer readable signal medium may be any computer-readable medium that can contain, store, communicate, propagate, or transport a program for use by or in connection with an instruction execution system, apparatus, or device, Program code embodied on a computer-readable medium may be transmitted using any appropriate medium, including but not limited to wireless, wireline, optical fiber cable, RF, etc.

Computer program code for carrying out operations of aspects of the present invention may be written in an object-oriented programming language such as Java, Smalltalk, C++ or the like. However, the computer program code for carrying out operations of aspects of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a compute readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A system and method can be provided to facilitate the comparison of different data sets. The methods and systems described herein are described in relation to an embodiment where a collective society can compile data related to intellectual property assets for which it has collected royalties but which are not registered with the collective society or cannot be identified with or matched to an existing work registration at the collective society. This data can be referred to as a pending list, as the collective society does not know who the rights holders of these intellectual property assets are and it therefore unable to pay the associated royalties to the rights holders. Intellectual property rights managers, referred to herein as the Catalog Owner, can maintain a catalog database regarding the rights holders of various intellectual property assets. The catalog database and the pending list can store the data in a different format which can make a direct comparison of the data difficult. The systems and methods described herein can permit matching of data between a pending list and a catalog database while maintaining privacy and security of each party's data. While described in the context of data matching and sharing between collective societies and catalog owners, as known to one skilled in the art, the systems and methods described herein can be applied to any embodiment where two or more parties desire to share and compare data while maintaining some privacy and security over the data.

Figure 30:
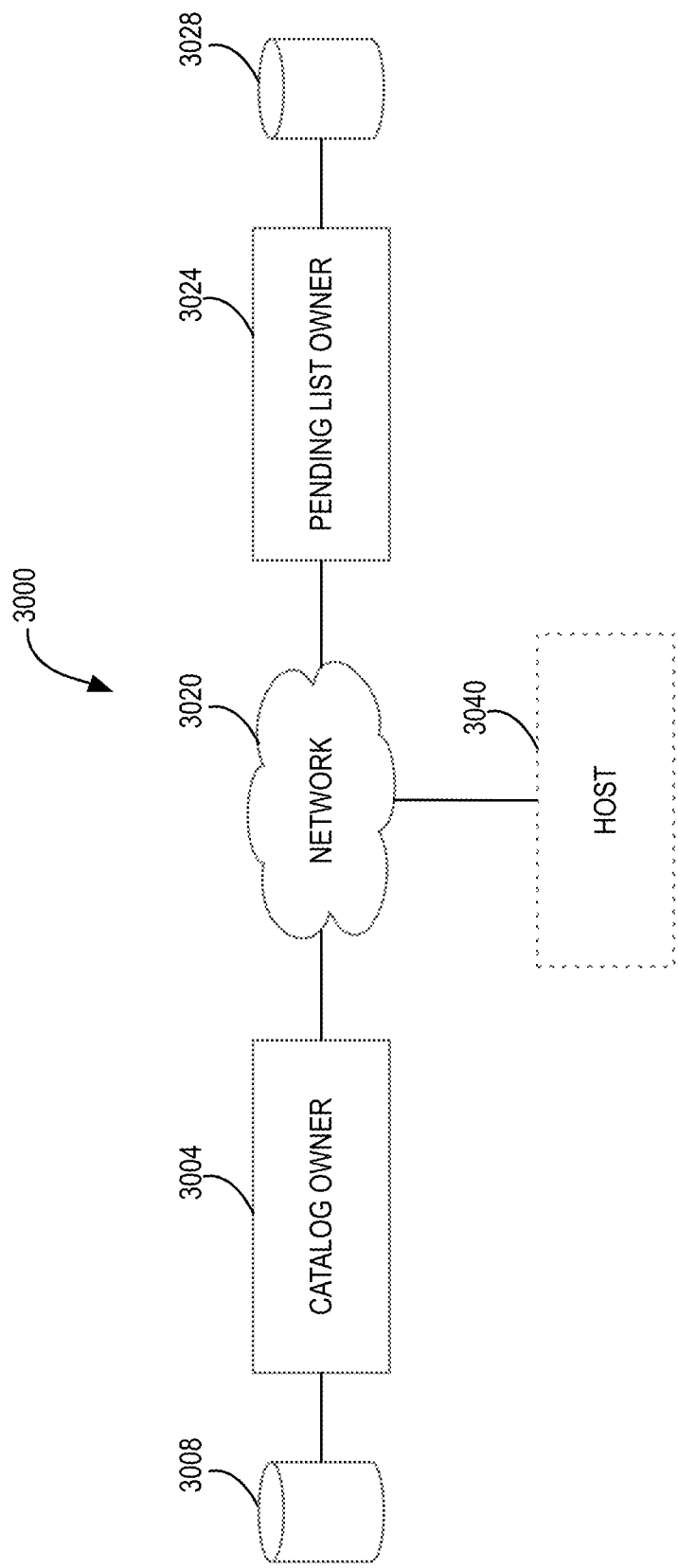
FIG. 30 is a simplified block diagram of an example system for managing data comparison and sharing in accordance with another example embodiment.

Reference is first made to FIG. 30, which illustrates a block diagram 3000 of components interacting with an example system 3000 for managing data comparison and sharing. System 3000 can be in communication with at least one catalog owner device 3004, at least one pending list owner device 3024 and, optionally, a host device 3040. Each of catalog owner device 3004, pending list owner device 3024 and host device 3040 are computing devices, such as computing device 3100 of FIG. 31.

Figure 31:
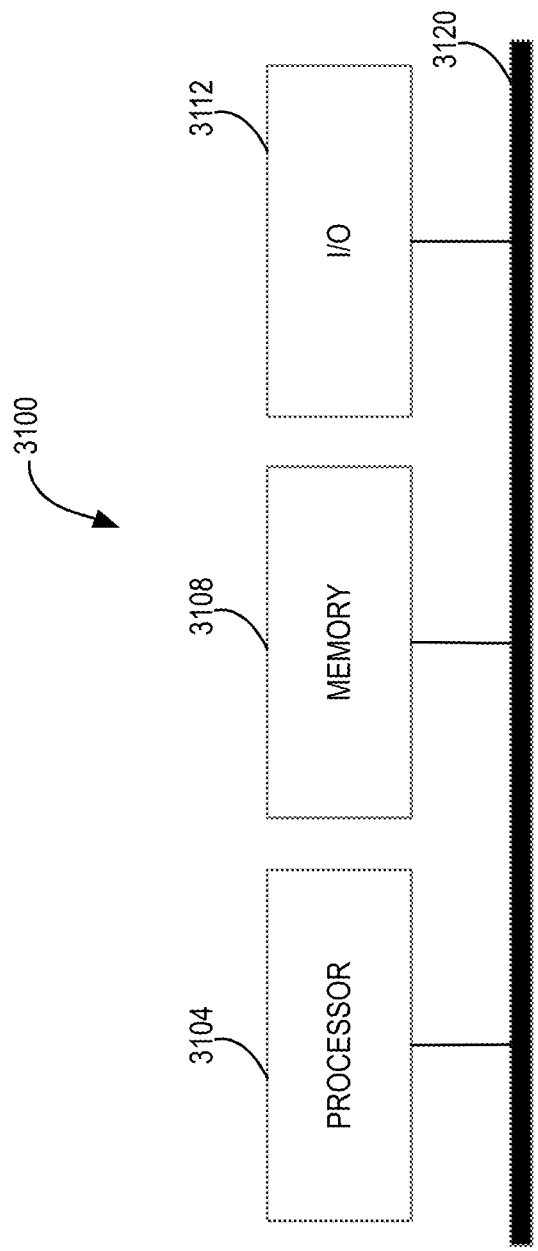
FIG. 31 is a simplified block diagram of one or more computing device of the system of FIG. 30.

Referring now to FIG. 31, computing device 3100 has at least a processor 3104, a memory 3108 and at least one input and/or output device 3112, each of which may be connected to a system bus 3120. In some cases, processor 3104 may be configured to communicate directly with memory 3108 or input/output device 3112, bypassing system bus 3120. Computing device 3100 may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

It will be understood that, in some embodiments, each of the processor 3104, the input/output device 3112, and the memory 3108 may be combined into a fewer number of components or may be separated into further components.

The processor 3104 may be any suitable processors, controllers or digital signal processors that can provide sufficient processing power depending on the configuration, purposes and requirements of the system 3000. In some embodiments, the processor 3104 can include more than one processor with each processor being configured to perform different dedicated tasks.

The input/output device 3112 may be any interface device that enables the computing device 3100 to receive inputs or transmit outputs. For example, input/output device 3112 can be at least one of a serial port, a parallel port or a USB port. The input/output device 3112 may also be at least one of an Internet, Local Area Network (LAN), Ethernet, Firewire, modem or digital subscriber line connection. Various combinations of these elements may be incorporated within the input/output device 3112.

For example, the input/output device 3112 may receive inputs from various input devices, such as a mouse, a keyboard, a touch screen, a thumbwheel, a track-pad, a track-ball, a card-reader, voice recognition software and the like depending on the requirements and implementation of computing device 3100. Similarly, the input/output device 3112 may transmit outputs, for example in the form of a display, a printer, or other output device.

The memory 3108 can include RAM, ROM, one or more hard drives, one or more flash drives or some other suitable data storage elements such as disk drives, etc. The memory 3108 can be used to store an operating system and software applications. For instance, the operating system can provide various basic operational processes. The programs can include various user programs so that a user can interact with input/output devices 3112 to perform various functions such as, but not limited to, viewing and/or responding to the notifications generated by the computing device 3100.

Referring once again to FIG. 30, the computing devices 3004, 3024 and 3040 may be any networked devices operable to connect to the network 3020. A networked device may couple to the network 3020 through a wired or wireless connection. Although only three computing devices are shown, in some embodiments there may be many pending list owner devices, catalog owner devices and/or host devices.

The network 3020 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), fixed line, local area network, wide area network, and others, including any combination of these, capable of interfacing with, and enabling communication between the computing devices 3004, 3024 and 3040.

As used herein, the term "software application" or "application" refers to computer-executable instructions, particularly computer-executable instructions stored in a non-transitory medium, such as a non-volatile memory, and executed by a processor. The processor, when executing the instructions, may receive inputs and transmit outputs to any of a variety of input or output devices to which it is coupled. Within an organization, a software application may be recognized by a name by both the people who use it, and those that supply or maintain it. A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs. For example, for many organizations, important applications and services rely on regular input from spreadsheets that may be obtained from third parties, so these spreadsheets may be identified as software applications.

Catalog owner device 3004 has a storage device 3008, which can be a database or other storage system capable of storing catalog data and/or list data, as described further herein. Likewise, pending list owner device 3024 has a storage device 3024, which can be a database or other storage system capable of storing catalog data and/or list data, as described further herein FIG. 1 depicts an overview process flow diagram of an example method of data sharing and comparison, and which may be implemented by a system such as system 3000 of FIG. 30. In this embodiment, the Catalog Owner may serve as the host system (e.g., accept inputs from other parties and perform processing locally, before sending results). A collective society or Pending List Owner (PLO) can interact with the catalog owner device in this example. The PLO may first prepare a pending list by removing any sensitive data from the pending list at step 104. At step 108, the PLO can login to the system (e.g., catalog owner device). Once logged in, the PLO can upload a pending list at step 112 and give the pending list a name as well as name or identify the columns of data at step 116.

The process of comparing a pending list with a catalog database can be referred to as a job. A user can create a new job by first naming the job at step 120. At step 124, the user can build a query, described in more detail below, and then test the query on a subset of the data at step 128. Once the test results are satisfactory, the user can run the job on the full data set at step 132. The job can return confirmed matches, fuzzy matches and no matches. A fuzzy match is a match that the application could not guarantee is correct and thus requires manual verification. These fuzzy matches can be resolved at step 136. At this step 136, in some embodiments, the host device (e.g., catalog owner device) may determine that "no" matches are to be masked, and therefore not returned to the user (e.g., pending list owner device) for manual verification, to ensure neither party can view sensitive data of the other party. The confirmed and fuzzy matched data can be downloaded or shared with the PLO device at step 140. At step 144 a user of the PLO device can review the results and then at step 148 authorize distribution of the pending royalty payments to the appropriate rights holder based on the matched results.

Figure 2:
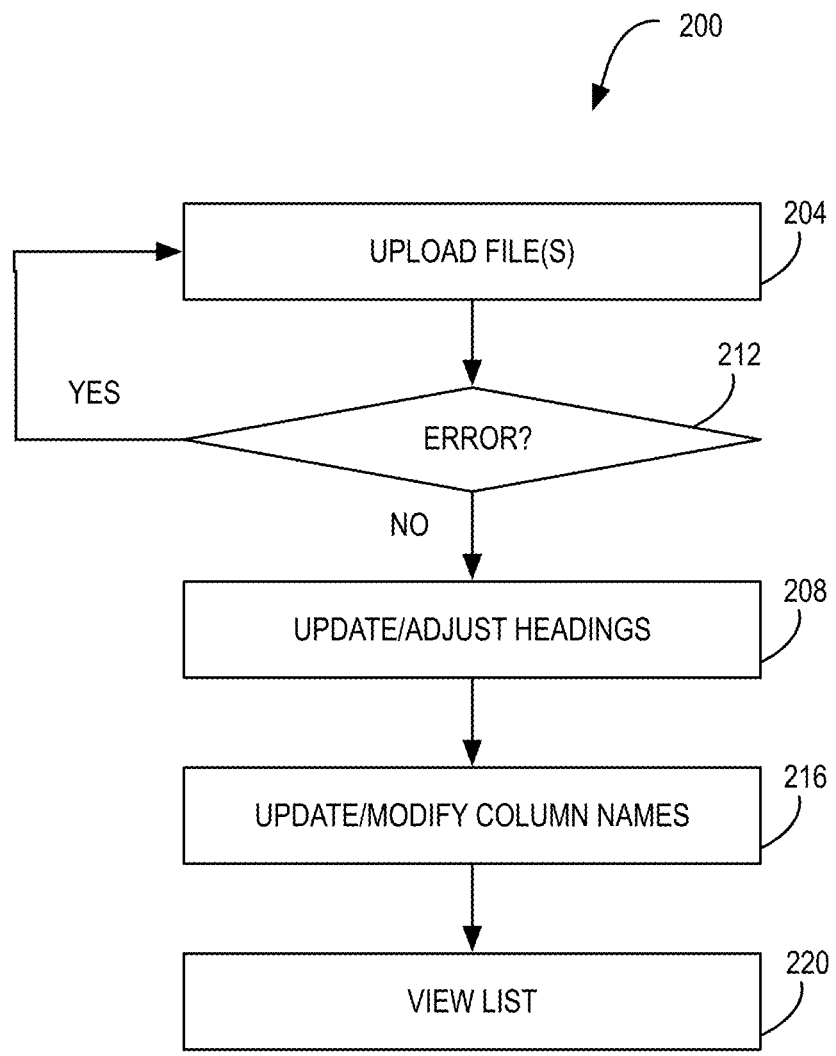
FIG. 2 is a process flow diagram depicting the pending list upload process according to the embodiment of the system and method for data comparison and sharing of FIG. 1.
Figure 3:
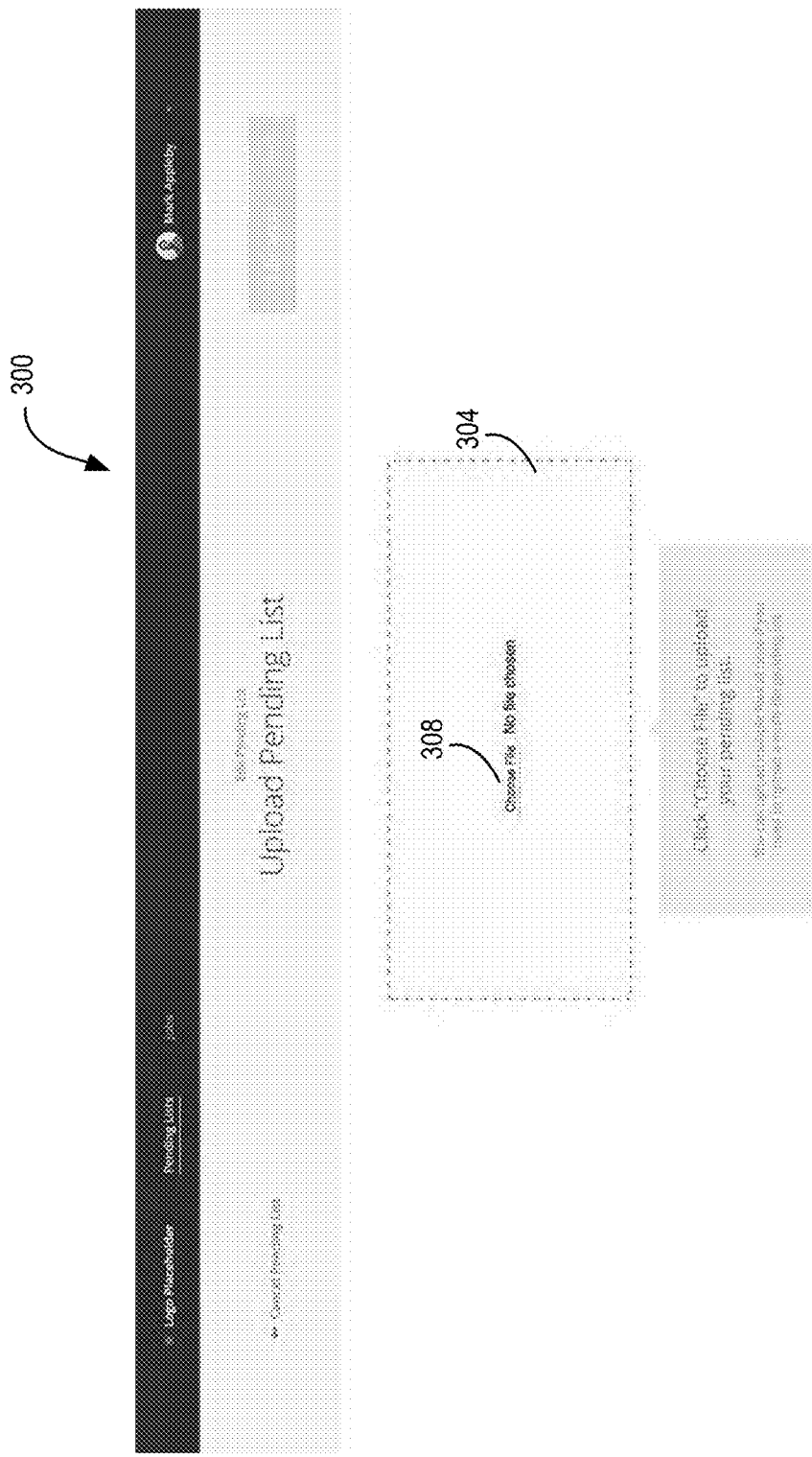
FIG. 3 is an example upload pending list interface.
Figure 4:
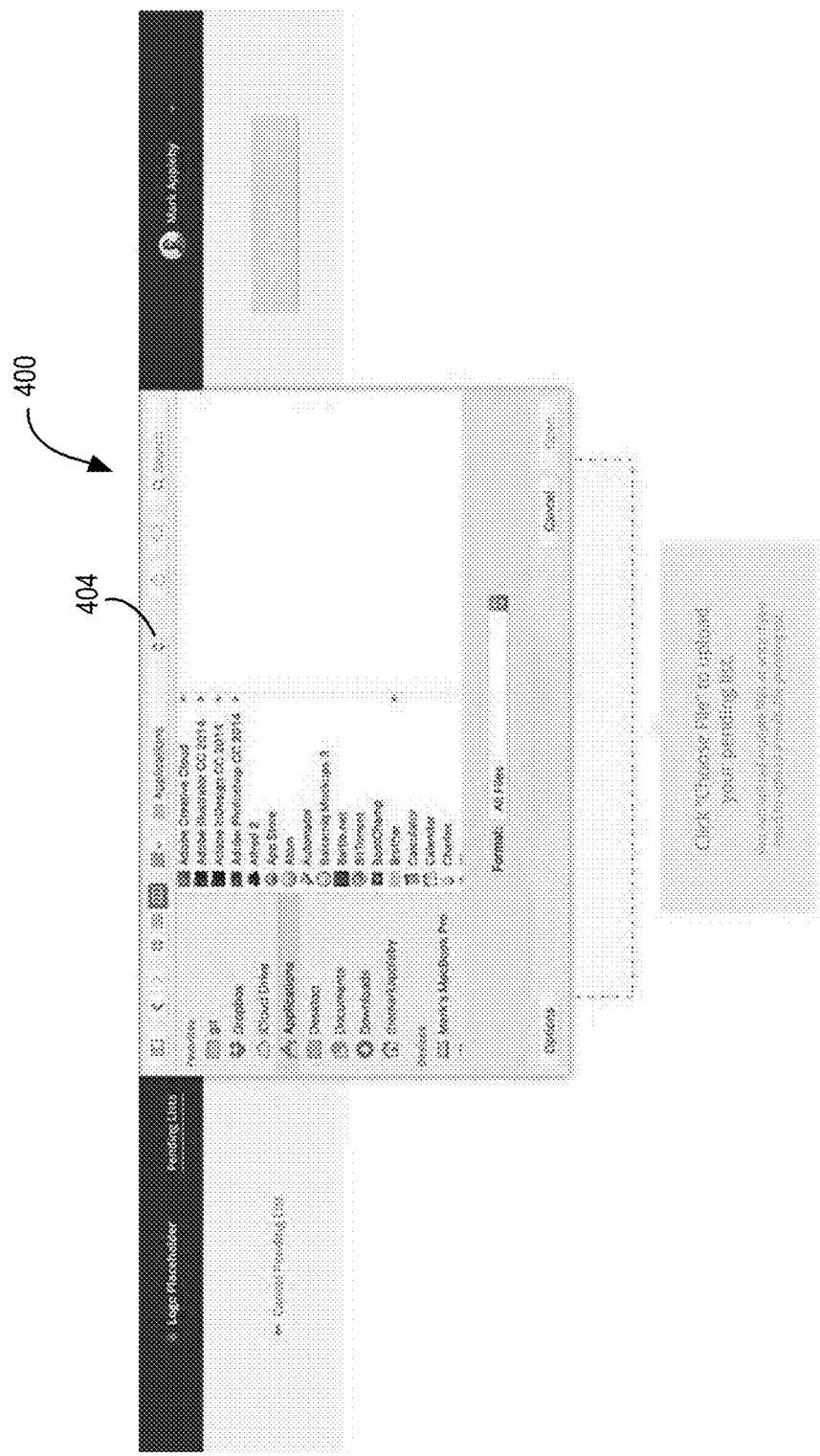
FIG. 4 illustrates an example file selection dialog of the upload pending list interface of FIG. 3.
Figure 5:
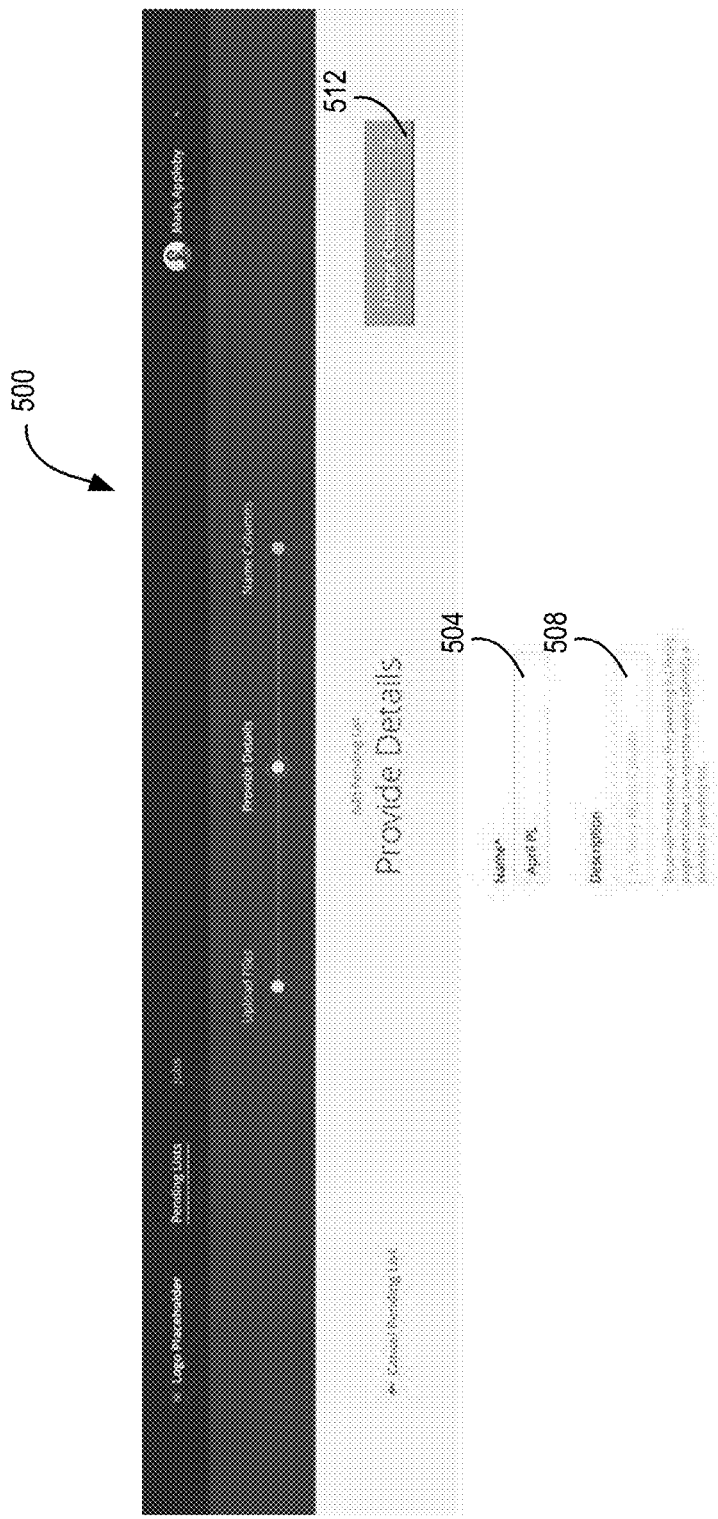
FIG. 5 is an example pending list naming interface according to the embodiment of the system and method for data comparison and sharing of FIG. 1.
Figure 6:
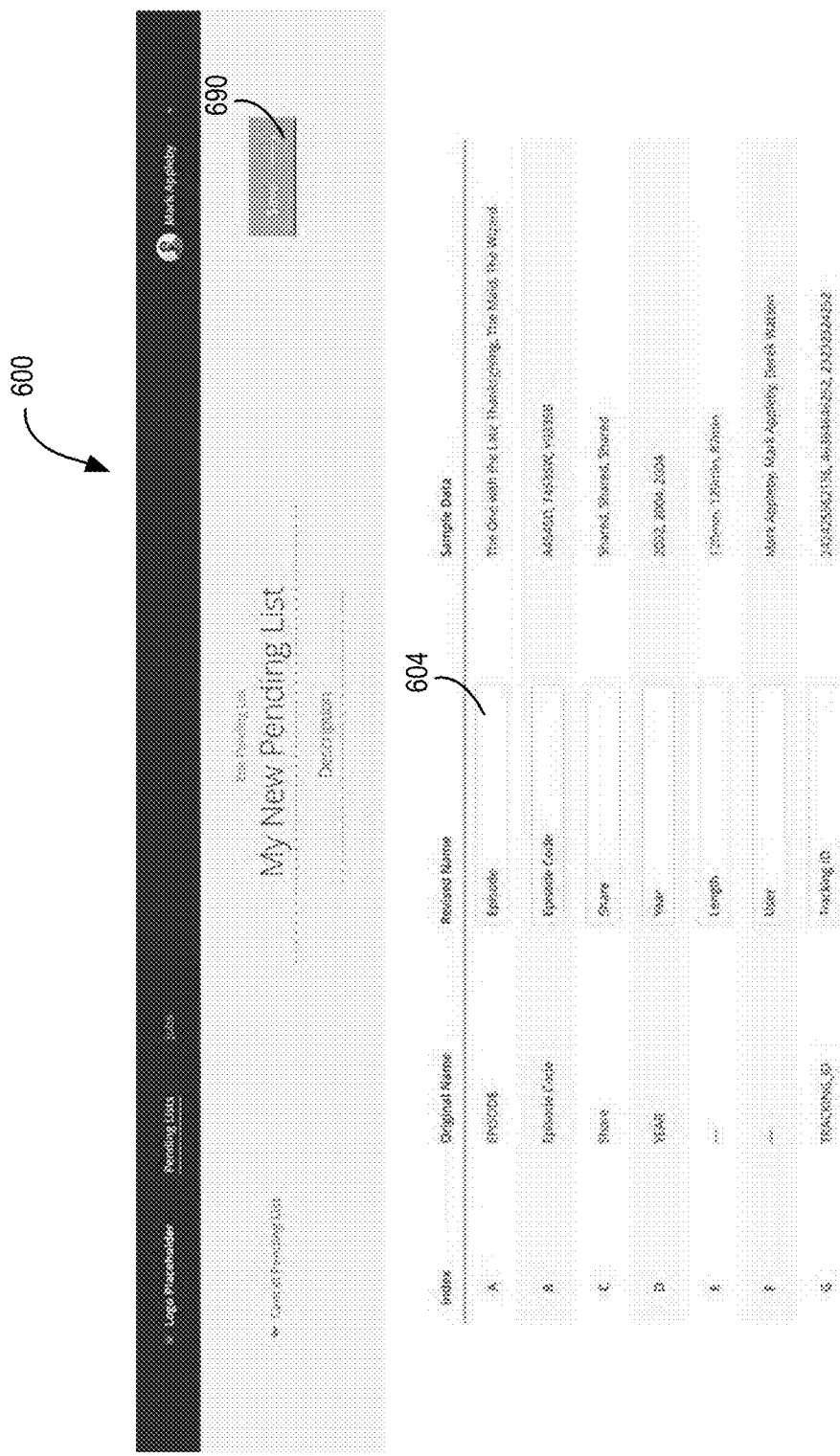
FIG. 6 is an example pending list column naming interface according to the embodiment of the system and method for data comparison and sharing of FIG. 1.
Figure 7:
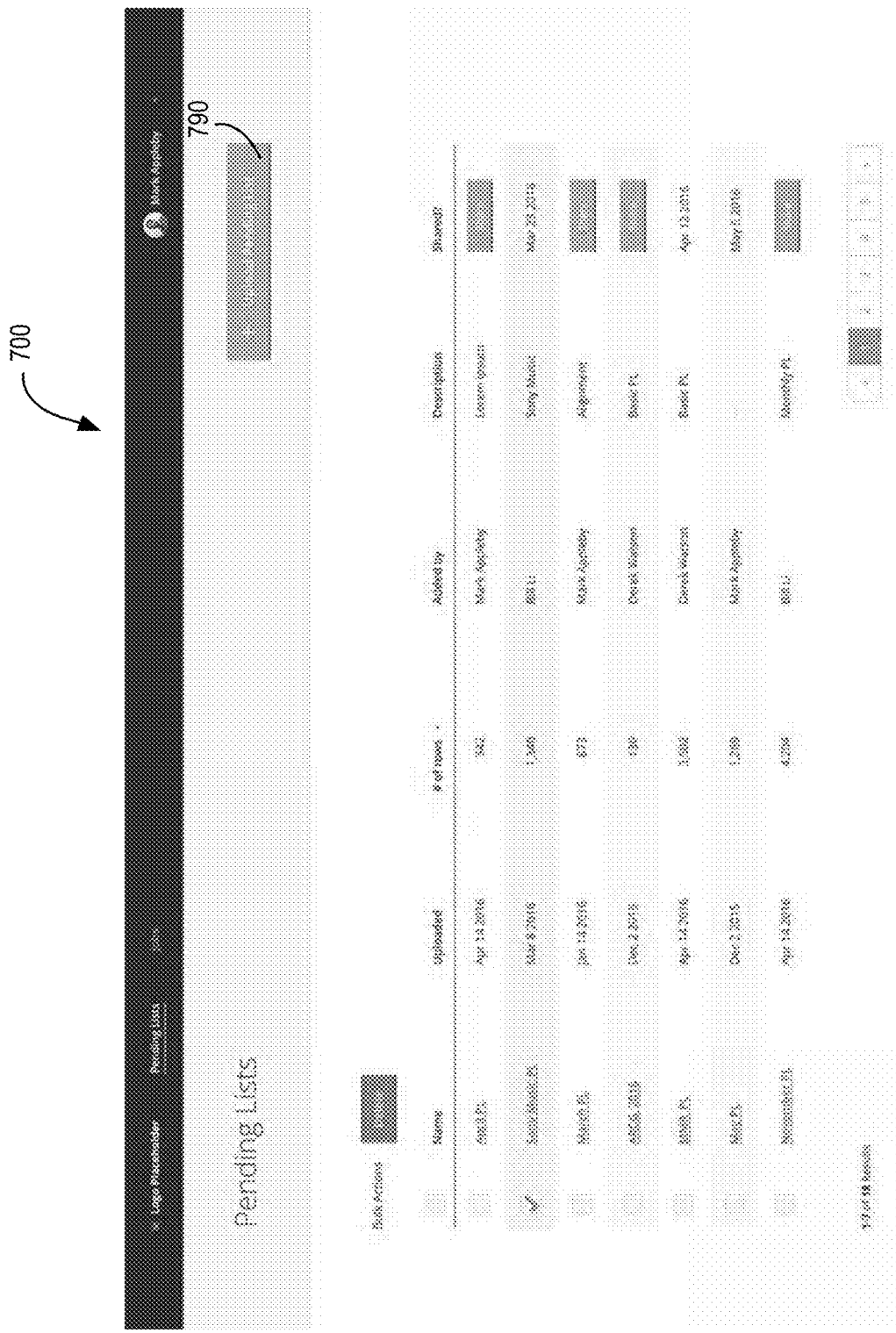
FIG. 7 is an example uploaded pending lists interface according to the embodiment of the system and method for data comparison and sharing of FIG. 1.

FIG. 2 depicts an example pending list upload process flow diagram, and example interfaces associated with this process are shown in FIGS. 3 to 7. Process 200 begins at step 204, in which the PLO can select one or more pending lists to upload, using a drag-and-drop target area 304 or an upload button 308 as shown in interface 300 of FIG. 3. Selection of the upload button 308 presents a drop-down dialog 404 as shown in interface 400 of FIG. 4. Pending lists can comprise a comma separated values (CSV) file or any other data file as will be known. If the upload is successful, the user can select a name using input boxes 504 and 508, and confirmation button 512, as shown in interface 500 of FIG. 5 for the pending list, and can indicate if headings are present in the pending list data file. If there is an error uploading the pending list, the user can be notified at step 212 and the user may need to make modifications to the rejected files. The user can revise the column naming for the data at step 216, using input boxes such as input box 604 of interface 600 as shown in FIG. 6, before confirming the column names by pressing the save button 690. The user is able to view a list of uploaded pending lists at step 220 as shown in interface 700 of FIG. 7, and optionally may upload additional pending lists using button 790.

Figure 8:
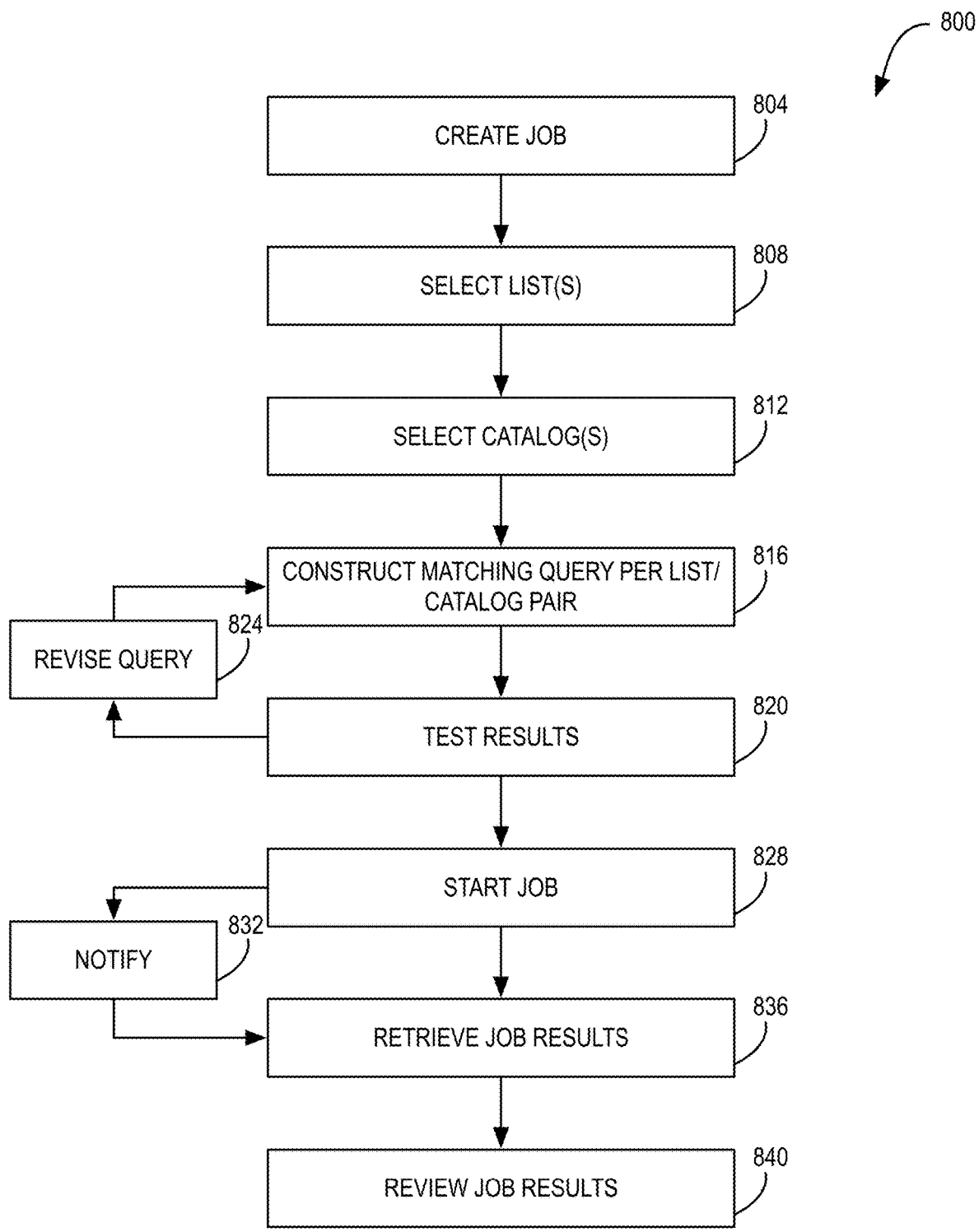
FIG. 8 is a process flow diagram depicting the job creation process according to the embodiment of the system and method for data comparison and sharing of FIG. 1.
Figure 9:
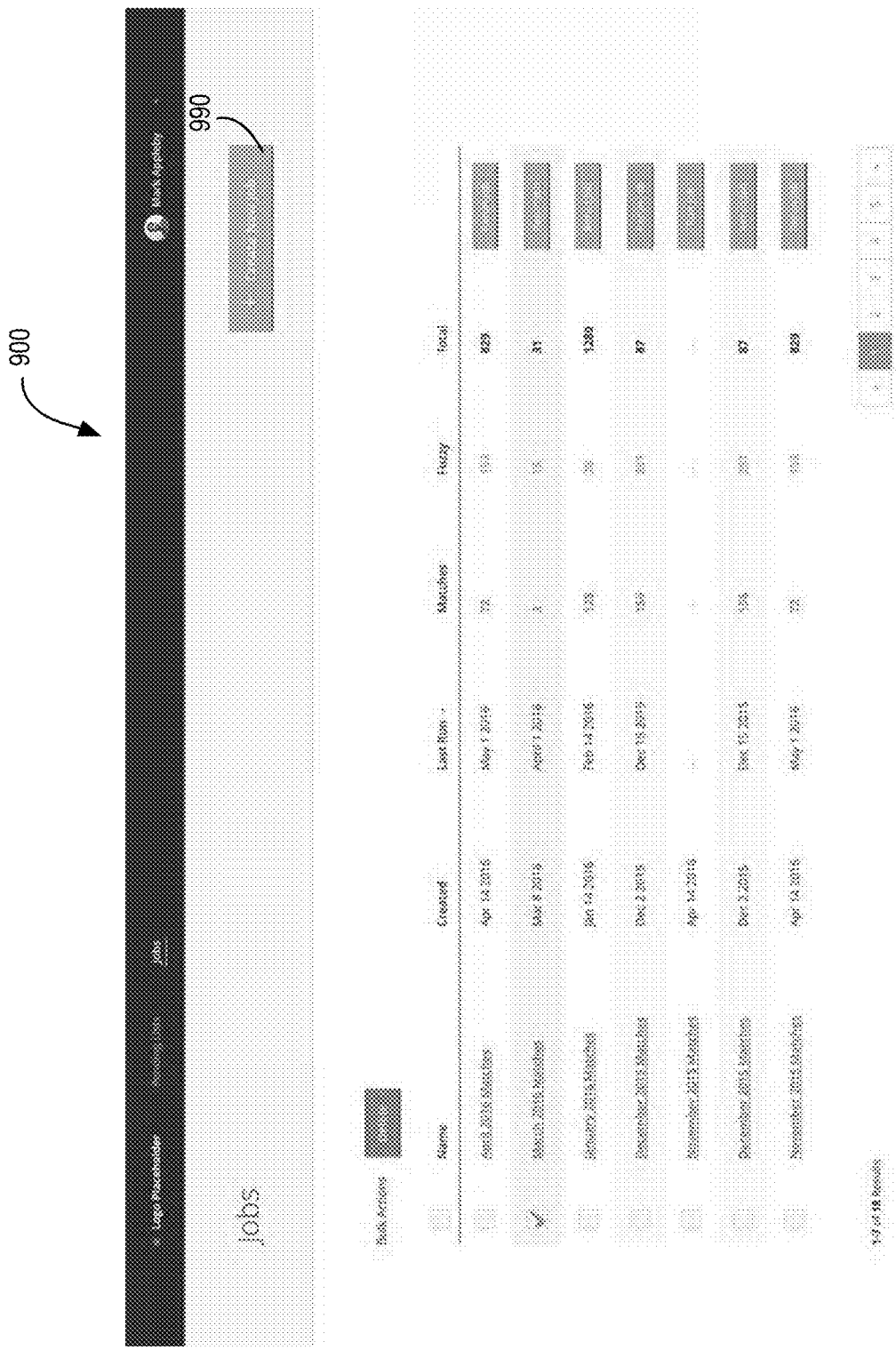
FIG. 9 is an example jobs interface according to the embodiment of the system and method for data comparison and sharing of FIG. 1.
Figure 10:
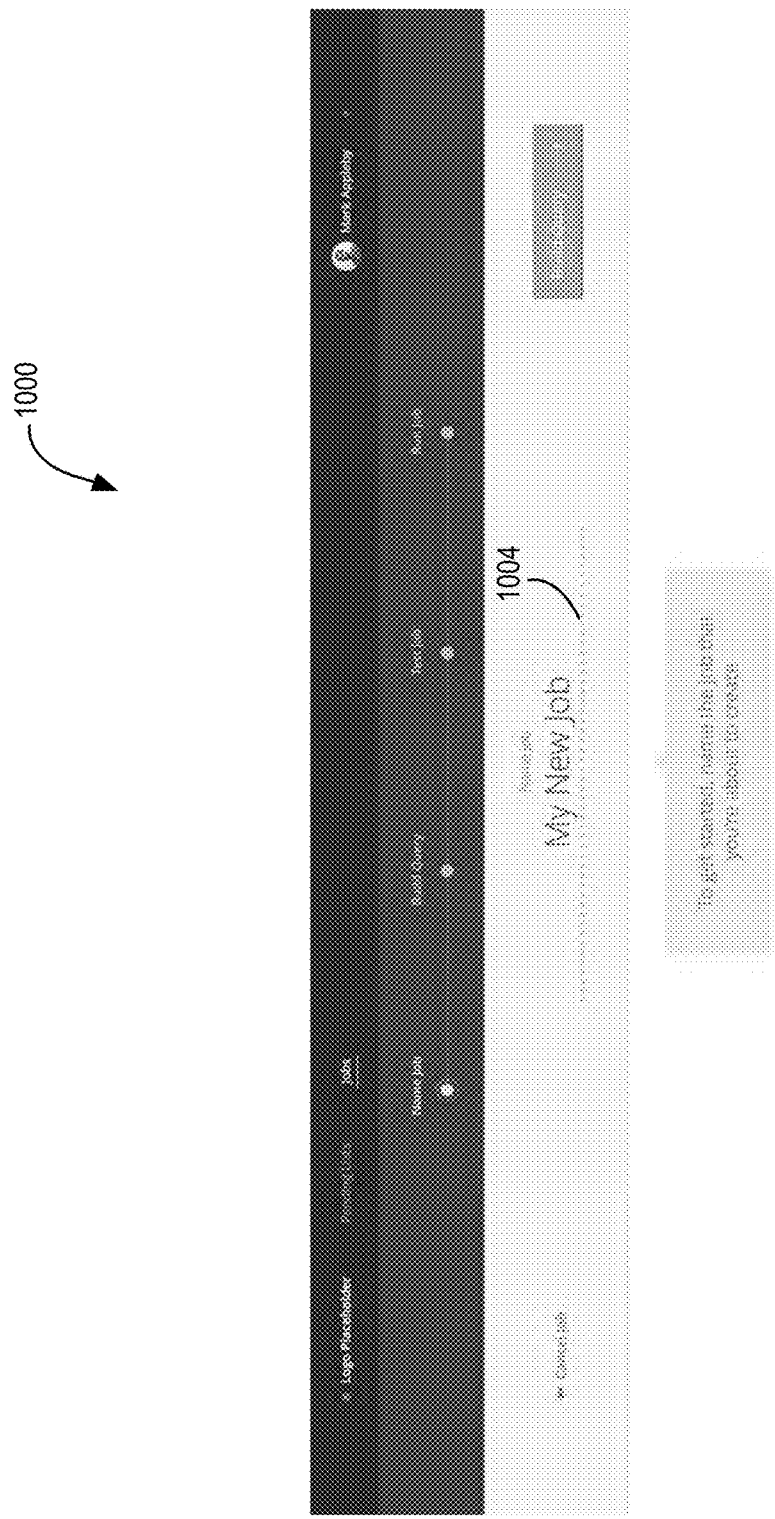
FIG. 10 is an example jobs naming interface according to the embodiment of the system and method for data comparison and sharing of FIG. 1.
Figure 11:
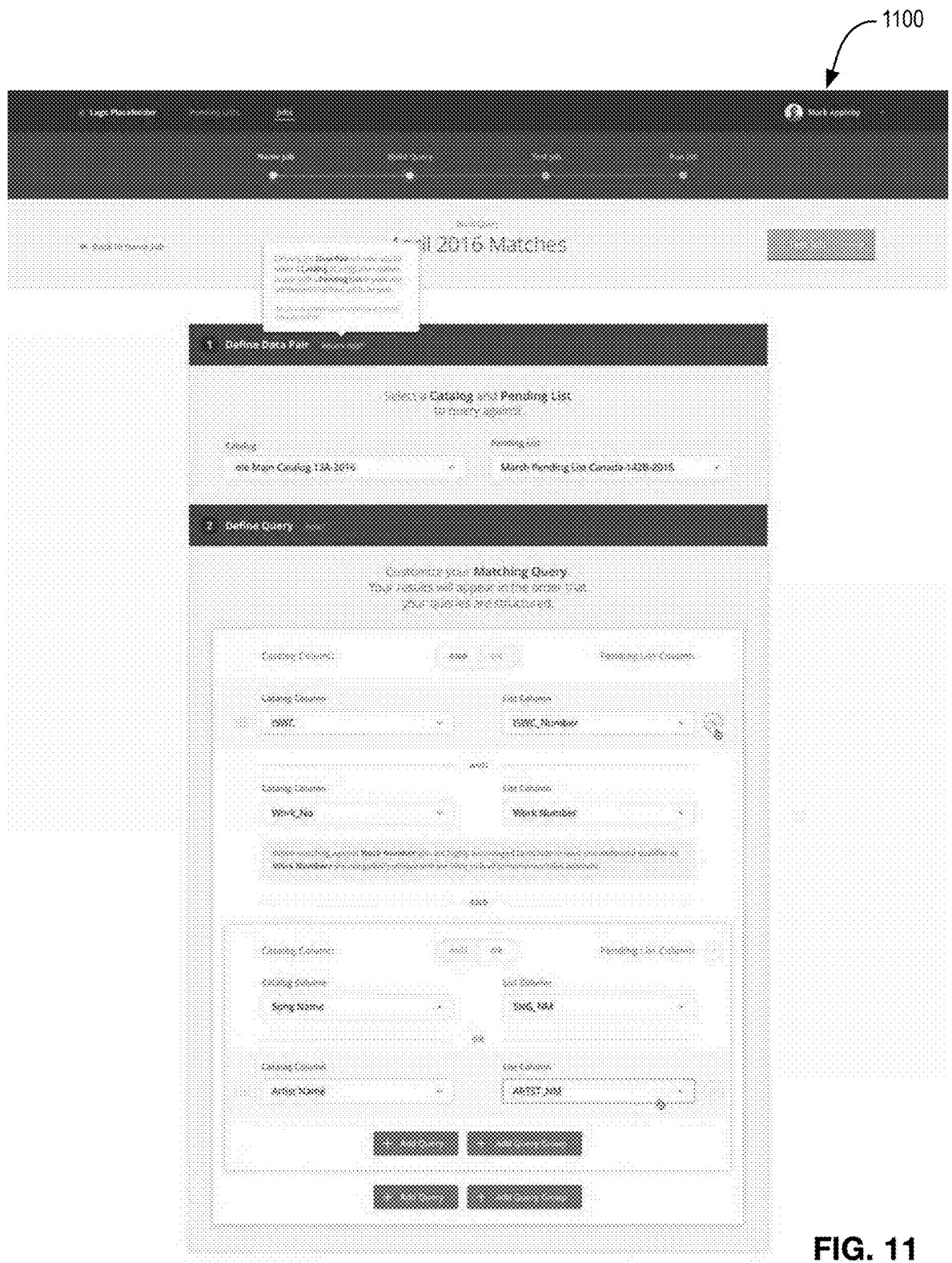
FIG. 11 is an example query builder interface according to the embodiment of the system and method for data comparison and sharing of FIG. 1.
Figure 12:
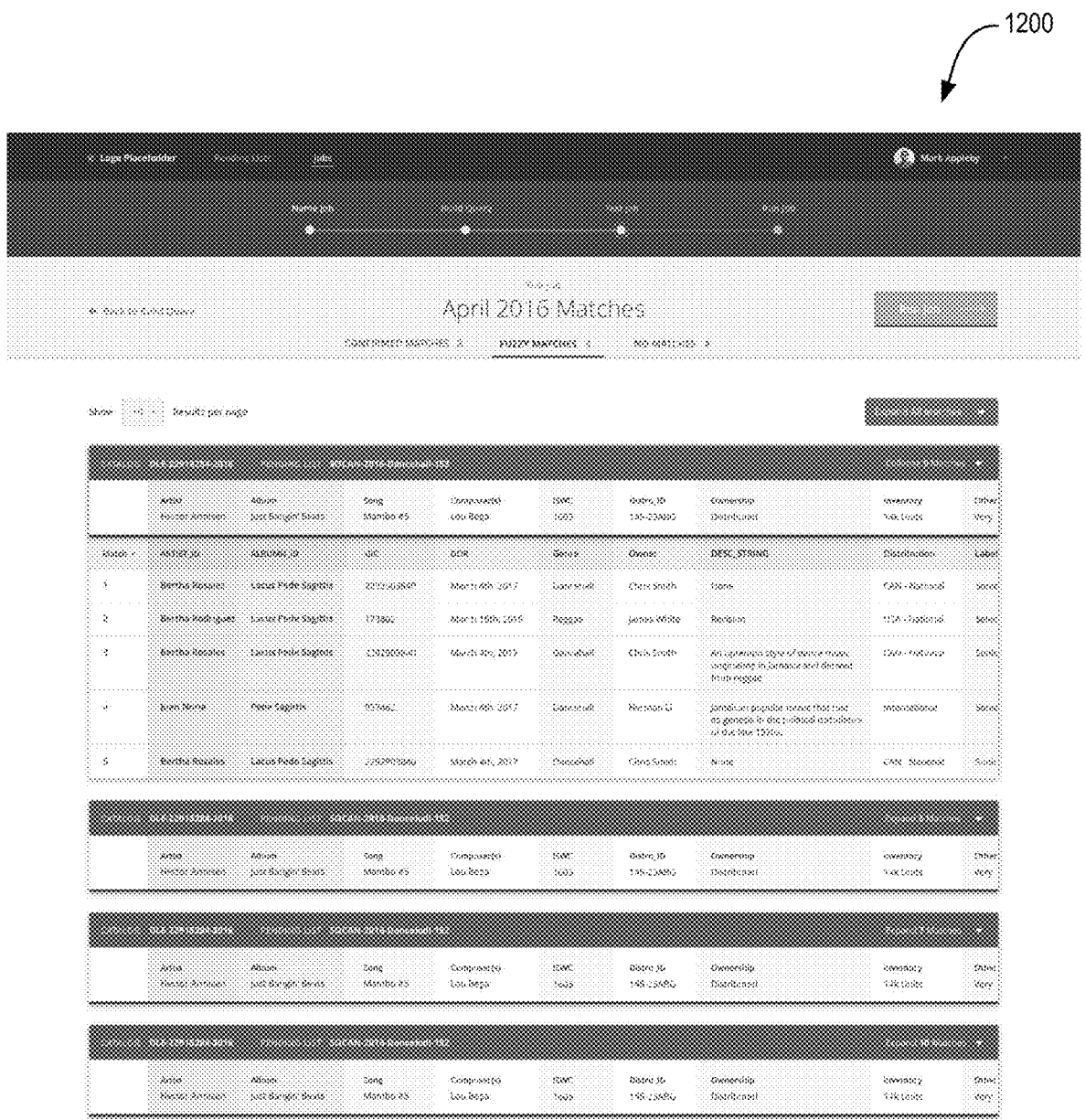
FIG. 12 is an example test job results interface according to the embodiment of the system and method for data comparison and sharing of FIG. 1.
Figure 13:
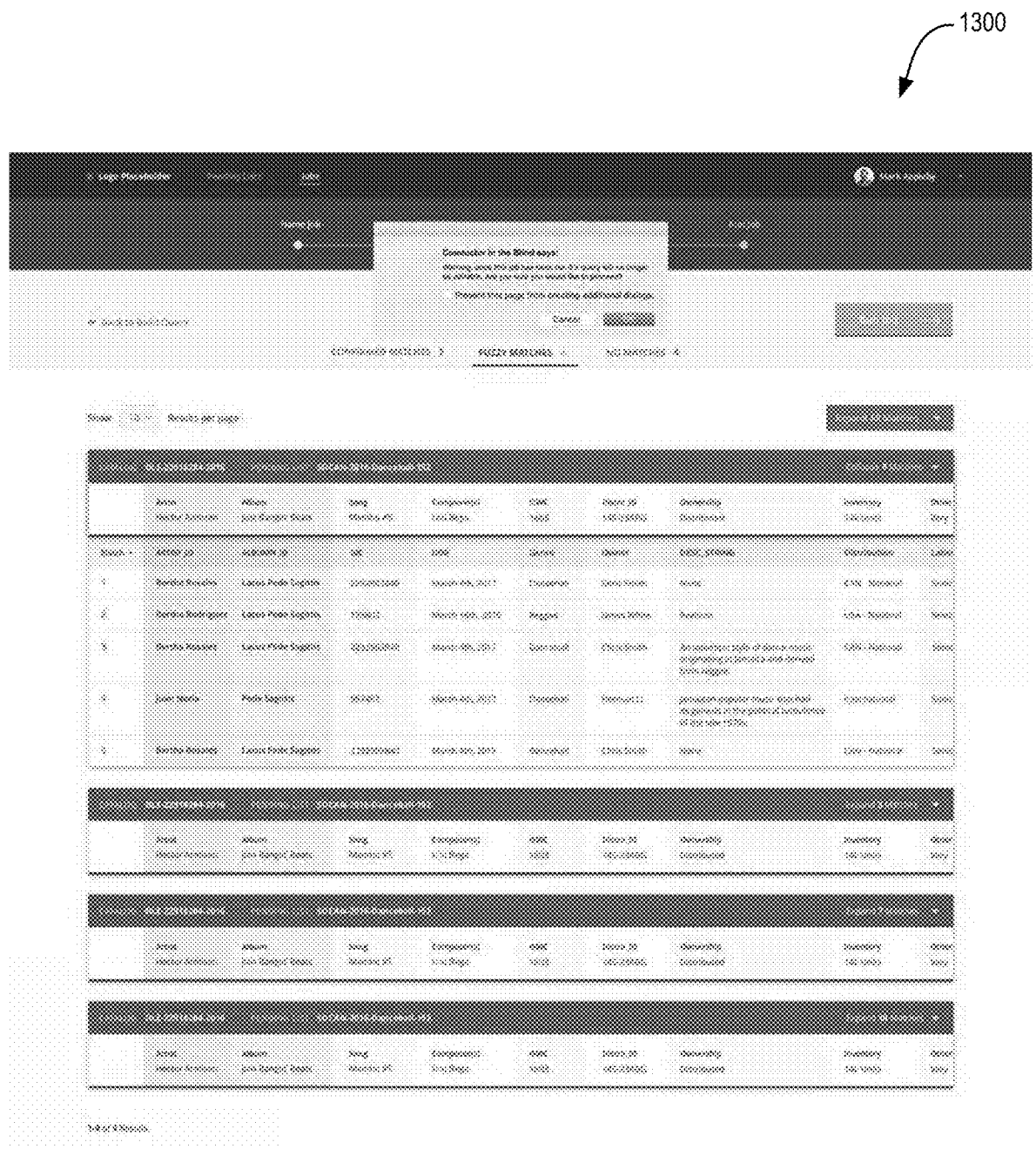
FIG. 13 is an example test job results interface with "run job" selected according to the embodiment of the system and method for data comparison and sharing of FIG. 1.

FIG. 8 depicts an example job creation process flow diagram, and example interfaces associated with this process are shown in FIGS. 9 to 14. Process 800 begins at step 804, in which a user can select to create a new job using button 990 of interface 900 of FIG. 9, and give the new job a name using input box 1004 of interface 1000 of FIG. 10. At step 808, the user can select one or more pending lists to be compared to one or more catalog databases or files selected at step 812. At step 816, the user can construct a matching query for each pending list/catalog pair. FIG. 11 illustrates an example query-building interface 1100 associated with the process of step 816. A test run on a subset of the data can be performed at step 820 to ensure that the results are satisfactory as shown in the example test results interface 1200 of FIG. 12. If the results are not satisfactory, at step 824 the user can revisit the constructor and revise the query. Once the test results are satisfactory at step 820, at step 828 the job can be started on the entire data sets as shown in interface 1300 of FIG. 13. This job can be started as a background process. The job can first attempt to make confirmed matches. Confirmed matches can include exact matches of the data fields in the selected query. Where the matches cannot be confirmed, an attempt can be made to match the asset with a fuzzy match. Fuzzy matching looks for similarly named assets, based on a normalized prefix of the data. An example of the fuzzy matching is illustrated in diagram 1500 of FIG. 15, which illustrates how an input normalized asset name 1504 and input normalized composer names 1508 can be fuzzy matched to normalized asset name 1524 and normalized composer names 1528.

Figure 14:
FIG. 14 is an example full run job results interface according to the embodiment of the system and method for data comparison and sharing of FIG. 1.
Figure 15:
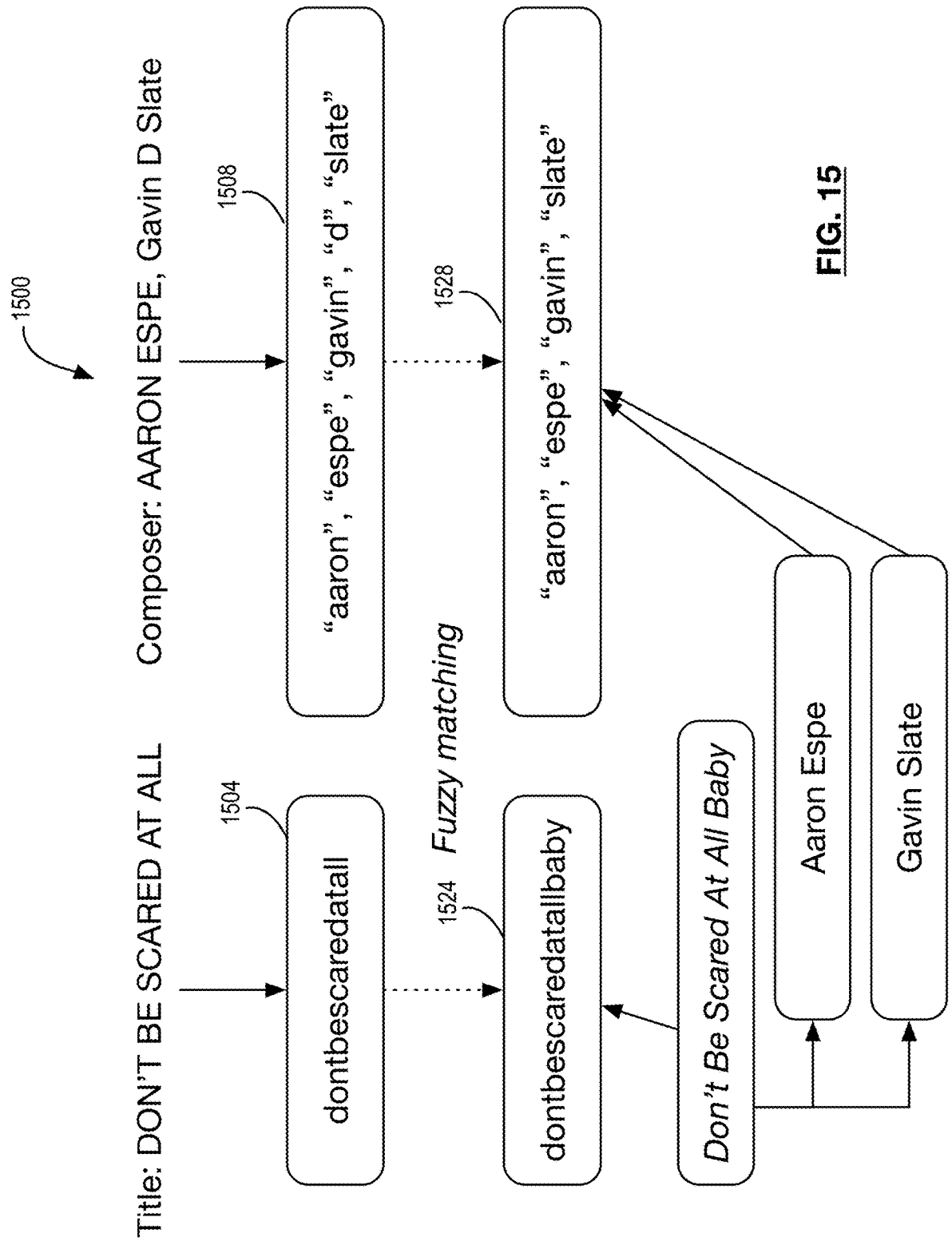
FIG. 15 is a graphical depiction of the method of fuzzy matching according to the embodiment of the system and method for data comparison and sharing of FIG. 1.

At step 832 the user can be notified by a browser notification or email when the job is complete. If the user is notified by email, the user may retrieve the job results at step 836. For example, the completion email can provide a link to the job results, which the user may open using a web browser. The full results can be provided at step 840 using a results interface 1400 as shown in FIG. 14.

Figure 16:
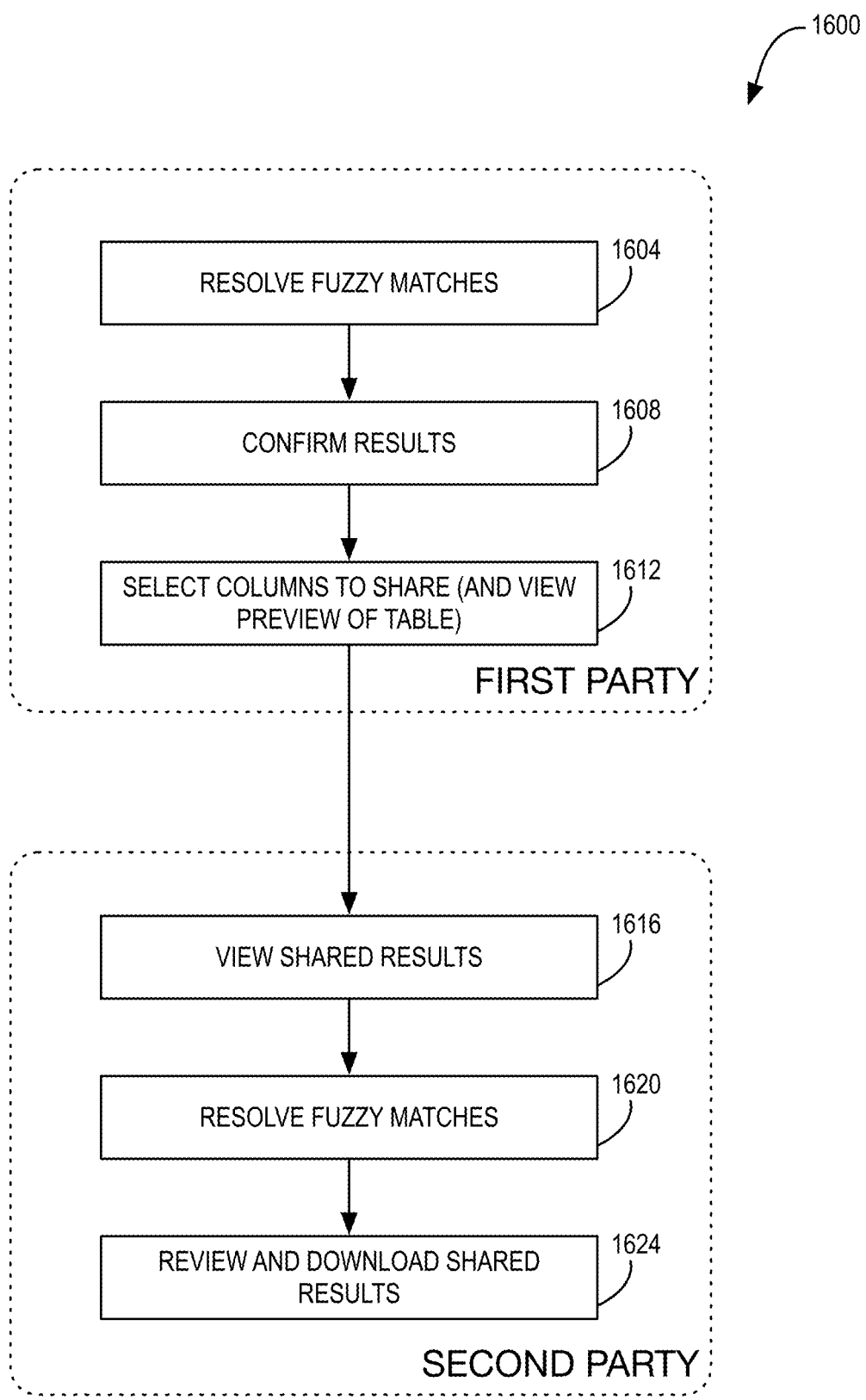
FIG. 16 is a process flow diagram depicting the results sharing process according to the embodiment of the system and method for data comparison and sharing of FIG. 1.

FIG. 16 depicts an example results sharing process flow diagram. Process 1600 may begin once a user has received the full results, to allow the user to review the results. In particular, at step 1604, the user can review the matches that were identified as fuzzy matches and can manually confirm whether or not the fuzzy matches represent the same data. However, as noted above, in at least some embodiments, the user cannot review masked matches (e.g., "no" matches that did not meet the criteria to qualify as a fuzzy match). The user can confirm the results at step 1608 and at step 1612 the user can select which columns to share and can, optionally, view a preview of the table to share. If the first party is a PLO, for example, the PLO can share the results of a job with a Catalog Host, which may be the second party. Likewise, if the first party is a Catalog Host, it may share results of a job with a PLO, which is then the second party. Once the results are shared, the receiving user can receive a share notification at step 1616 which can include a link to the shared results. The receiving user can also review the fuzzy matches at step 1620 and can download the reviewed results at step 1624.

Figure 17:
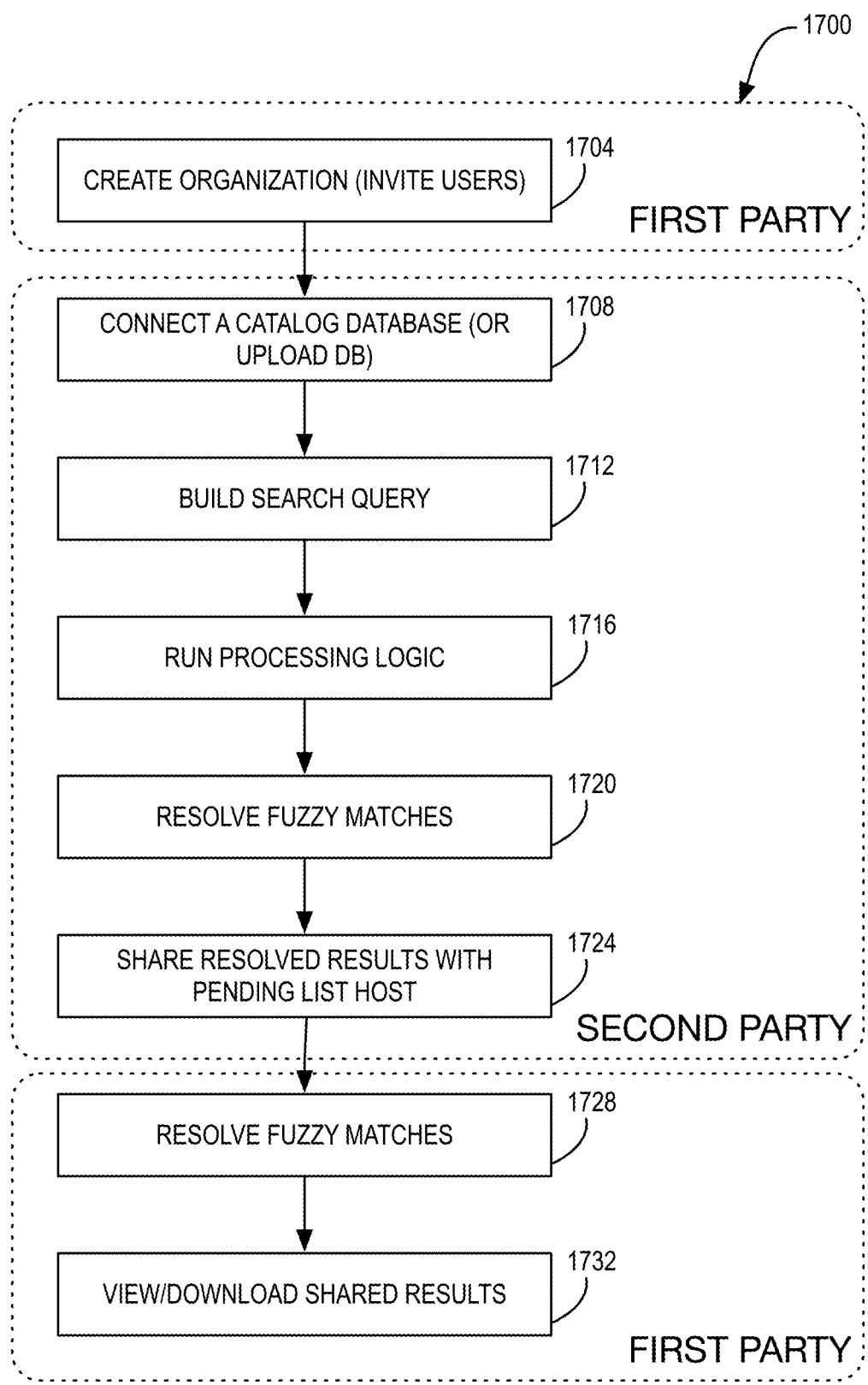
FIG. 17 is a process flow diagram depicting an overview of a second embodiment of the system and method for data comparison and sharing.
Figure 18:
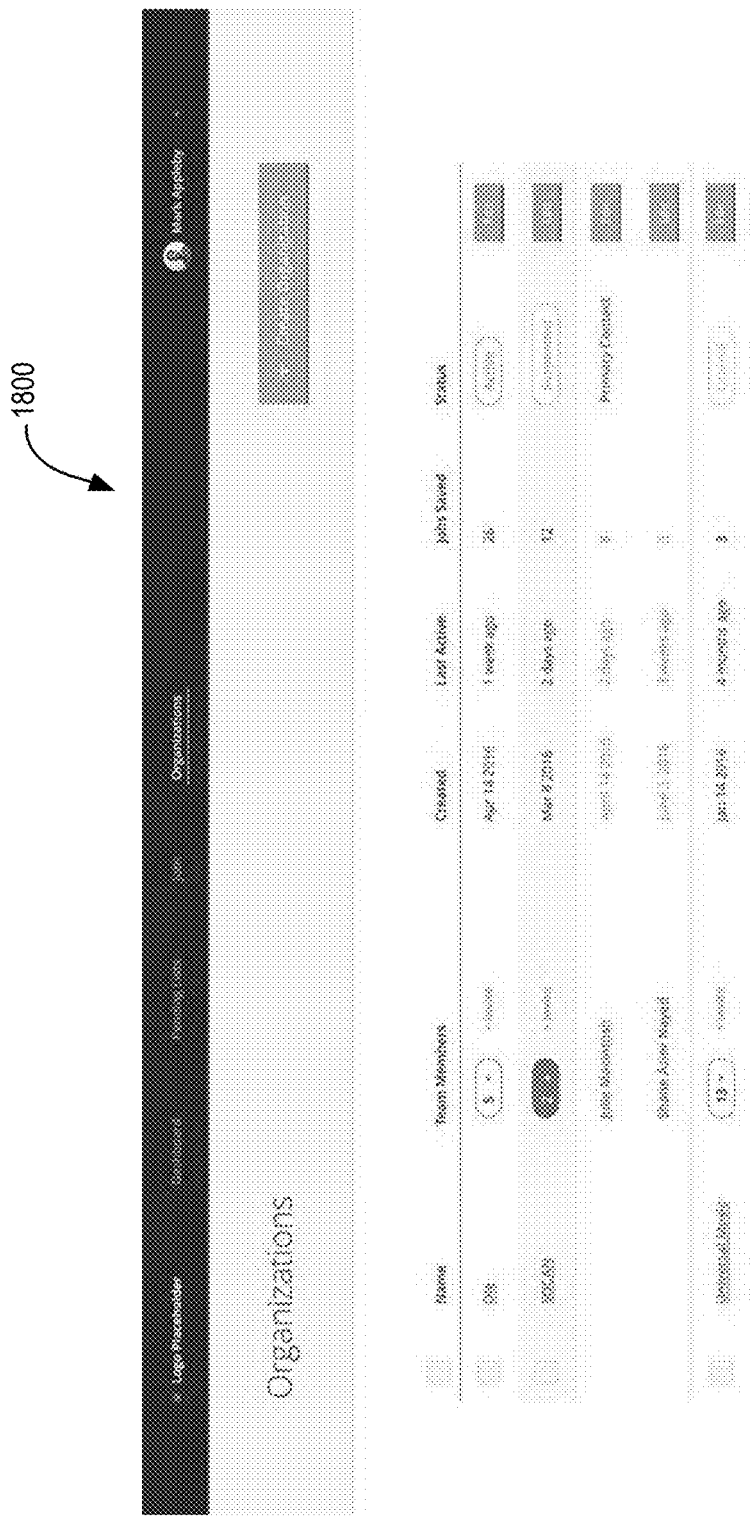
FIG. 18 is an example organizations interface according to the embodiment of the system and method for data comparison and sharing of FIG. 17.

FIG. 17 depicts another example embodiment of the systems and methods of data management and comparison, where the application can be hosted by one of the organizations with an interest in sharing and comparing the data. In this embodiment, the host can be the PLO, illustrated as the first party in FIG. 17. This embodiment functions in the same way as the embodiment described with reference to FIGS. 1 to 16, except that the PLO host can create organizations representing the entities it would like to share and compare data with and invite users associated with the organizations at step 1704, and as illustrated further in interface 1800 of FIG. 18. In this embodiment, organizations can be the organizations that manage the rightsholders of the intellectual property assets. In this embodiment, it can be the Catalog Owner, shown as the second party in FIG. 17, who connects a catalog database or uploads a catalog data file at step 1708. The Catalog Owner can build a query at step 1712, run the processing logic at step 1716, manually resolve any fuzzy matches as described herein and share the resolved results at step 1724 as described above. The PLO host can then review the fuzzy match results at step 1728 and view or download the results at step 1732.

Figure 19:
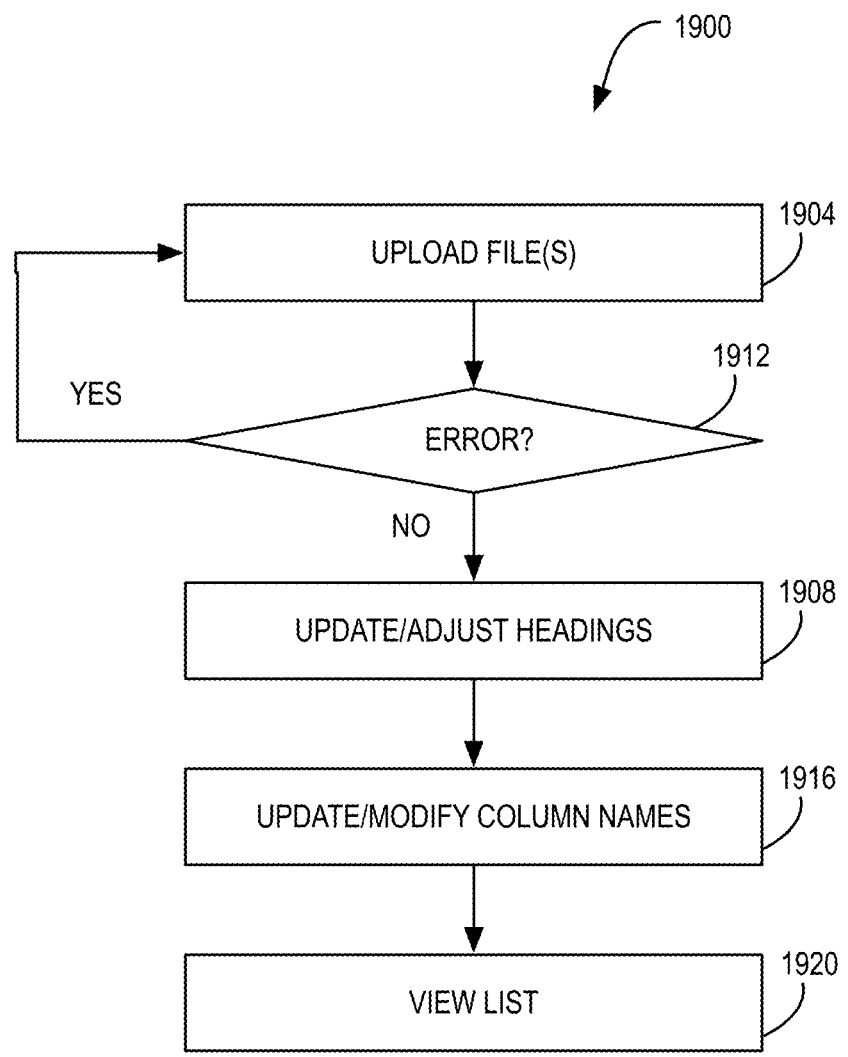
FIG. 19 is a process flow diagram depicting the catalog connection process according to the embodiment of the system and method for data comparison and sharing of FIG. 17.

FIG. 19 an example process flow diagram that depicts catalog connection process 900 and corresponds to pending list upload process 200 described above. At 1904, the user may upload one or more files (e.g., CSV files). At 1912, if an error was detected during upload, the process may return to 1904. Otherwise, at 1908, the system may update or adjust headings and names. At 1916, the user may update or modify column names, and at 1920, the user may view the uploaded list. In some embodiments, rather than uploading a catalog file, a connection can be established directly with a catalog database of the Catalog Owner.

Figure 20:
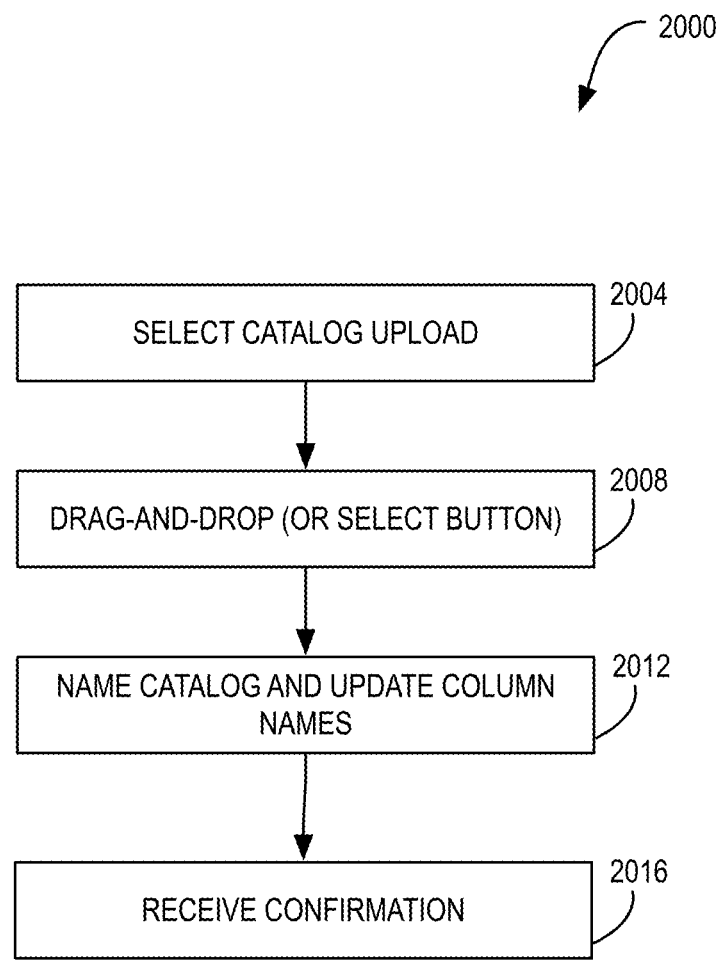
FIG. 20 is a process flow diagram depicting the CSV catalog upload process according to the embodiment of the system and method for data comparison and sharing of FIG. 17.

FIG. 20 is an example process flow diagram that depicts CSV catalog upload process 2000 which is an example embodiment of catalog connection process 1900 for uploading CSV catalogs. At 2004, the user may select a catalog upload option and, at 2008, drag and drop the desired catalog files (e.g., CSV files) onto a target area, or select an upload button). At 2012, the catalog is uploaded and the system names the catalog and populates column names. At 2016, the user receives a confirmation that the catalog(s) upload was successful.

Figure 21:
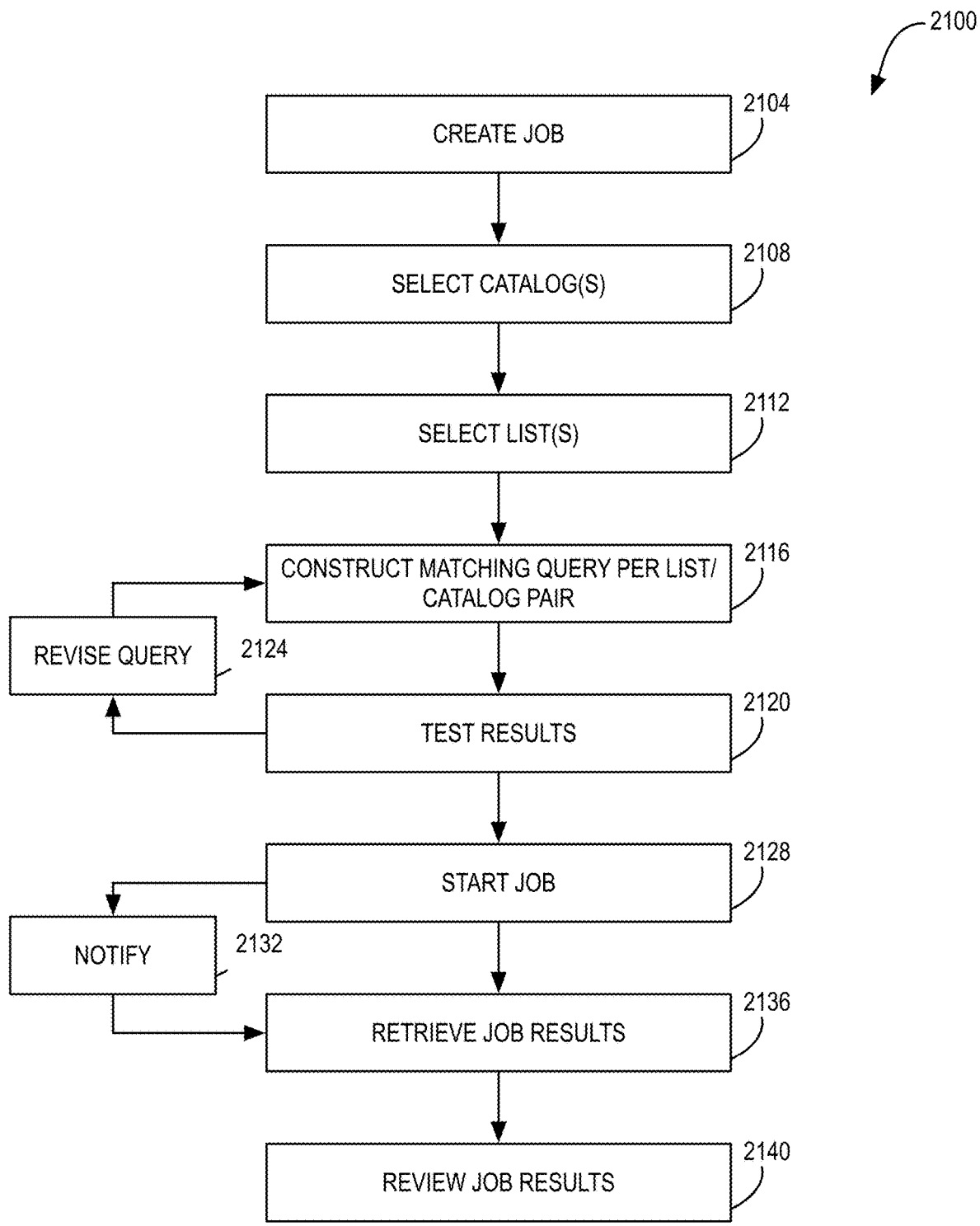
FIG. 21 is a process flow diagram depicting the job creation process according to the embodiment of the system and method for data comparison and sharing of FIG. 17.

FIG. 21 is an example process flow diagram that depicts another example job creation process 2100, which generally corresponds to job creation process 800 described above with reference to FIG. 8.

Figure 22:
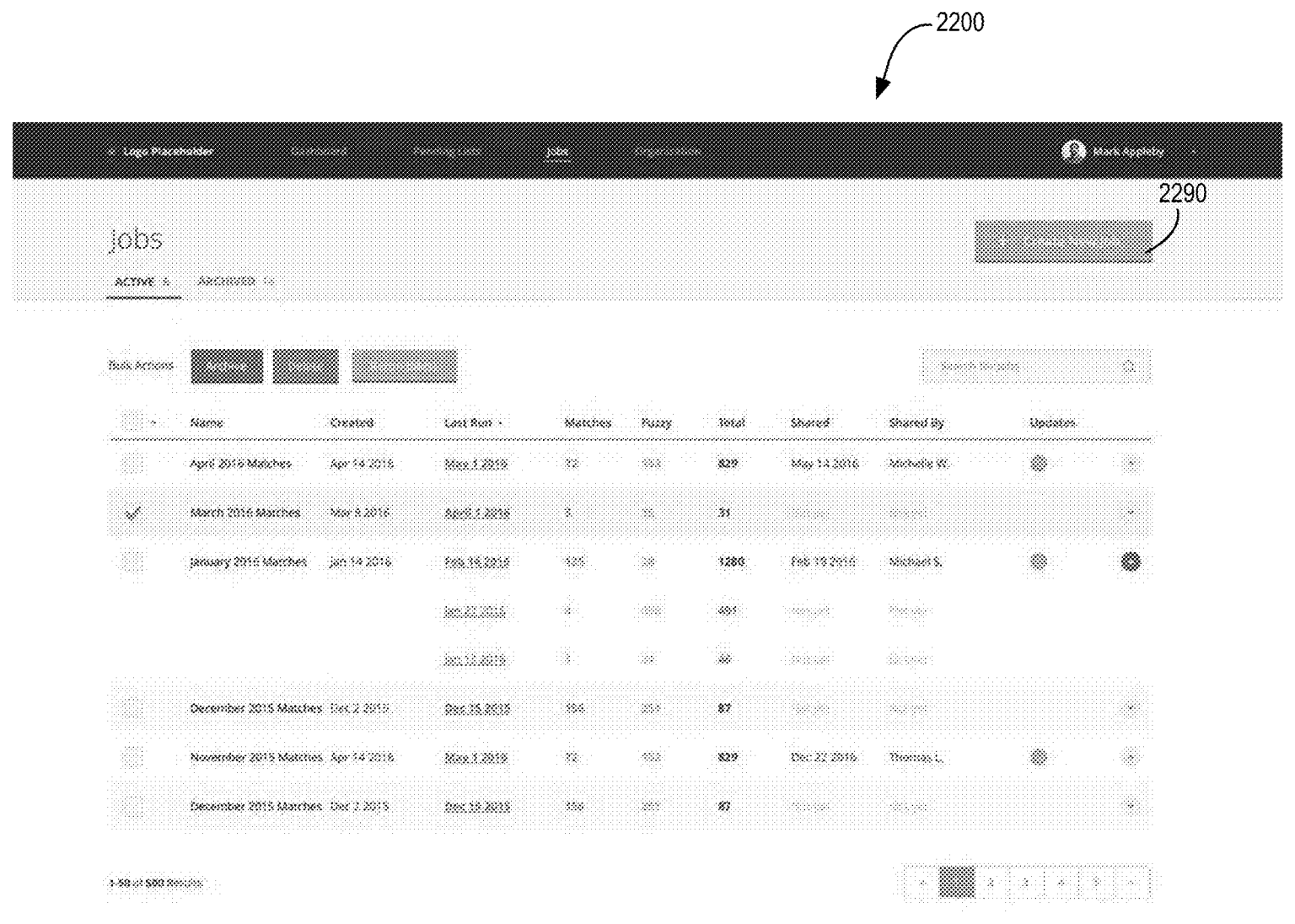
Figure 23:
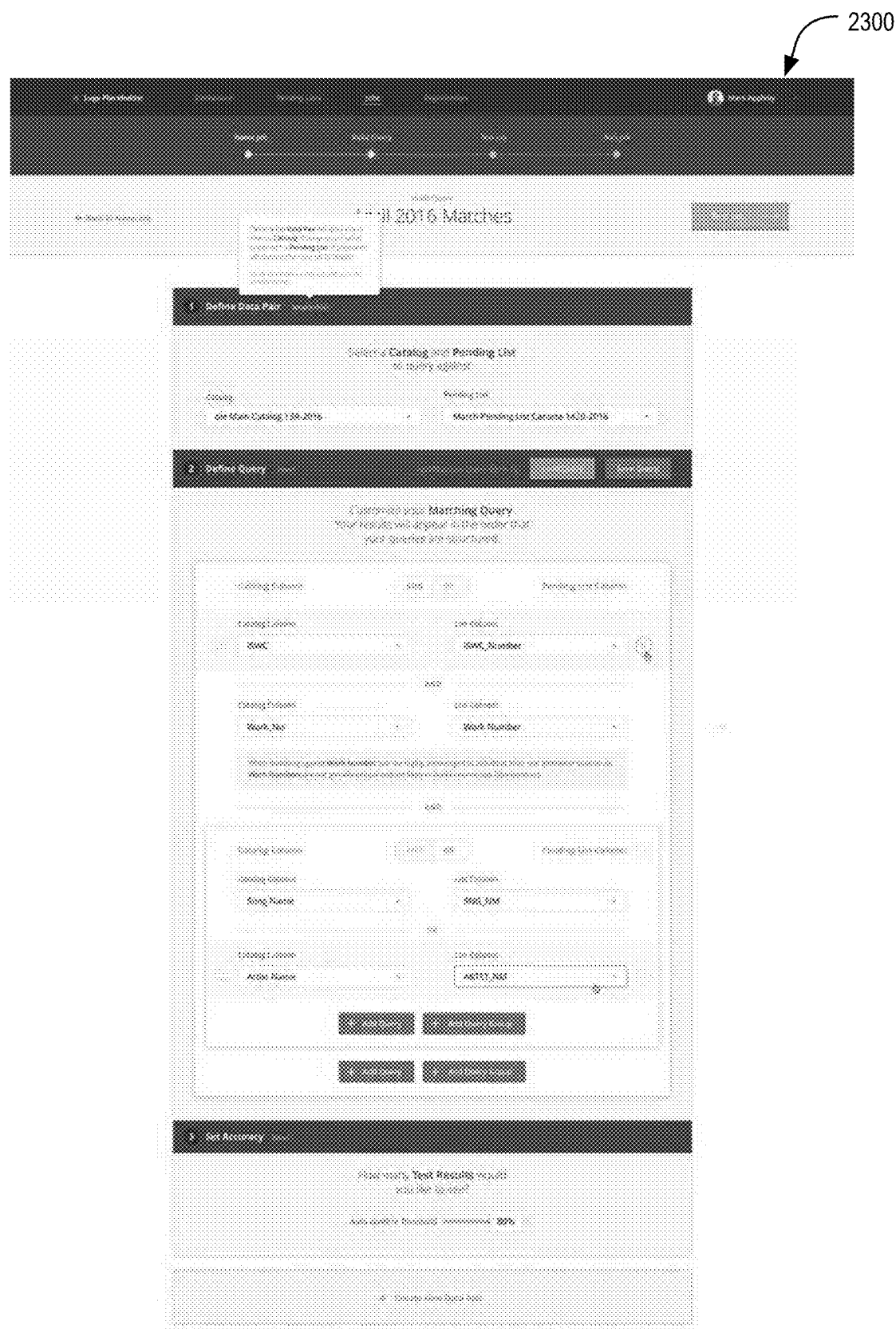
FIG. 23 is an example query builder interface according to the embodiment of the system and method for data comparison and sharing of FIG. 17.
Figure 24:
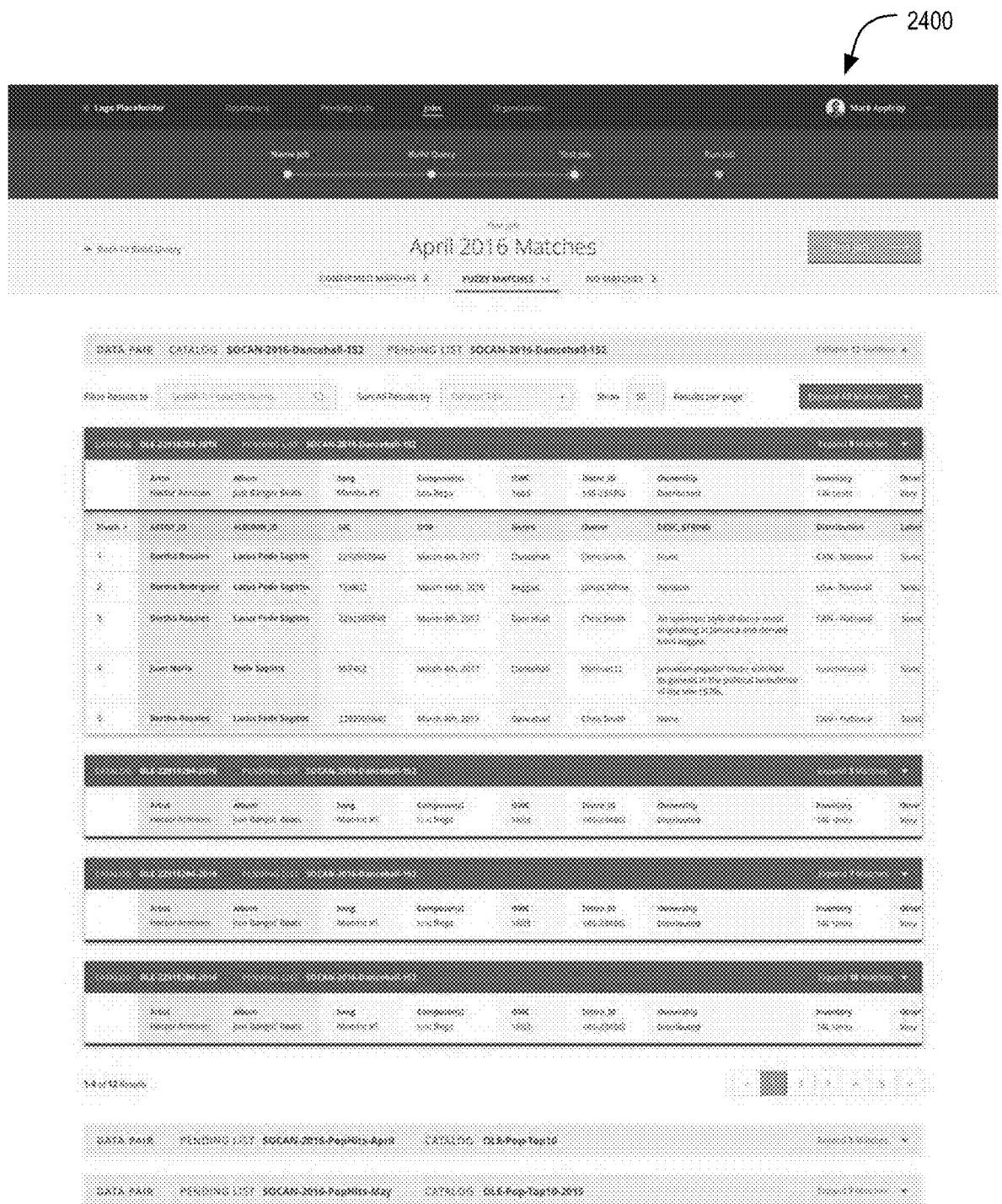
FIG. 24 is an example test job results interface according to the embodiment of the system and method for data comparison and sharing of FIG. 17.
Figure 25:
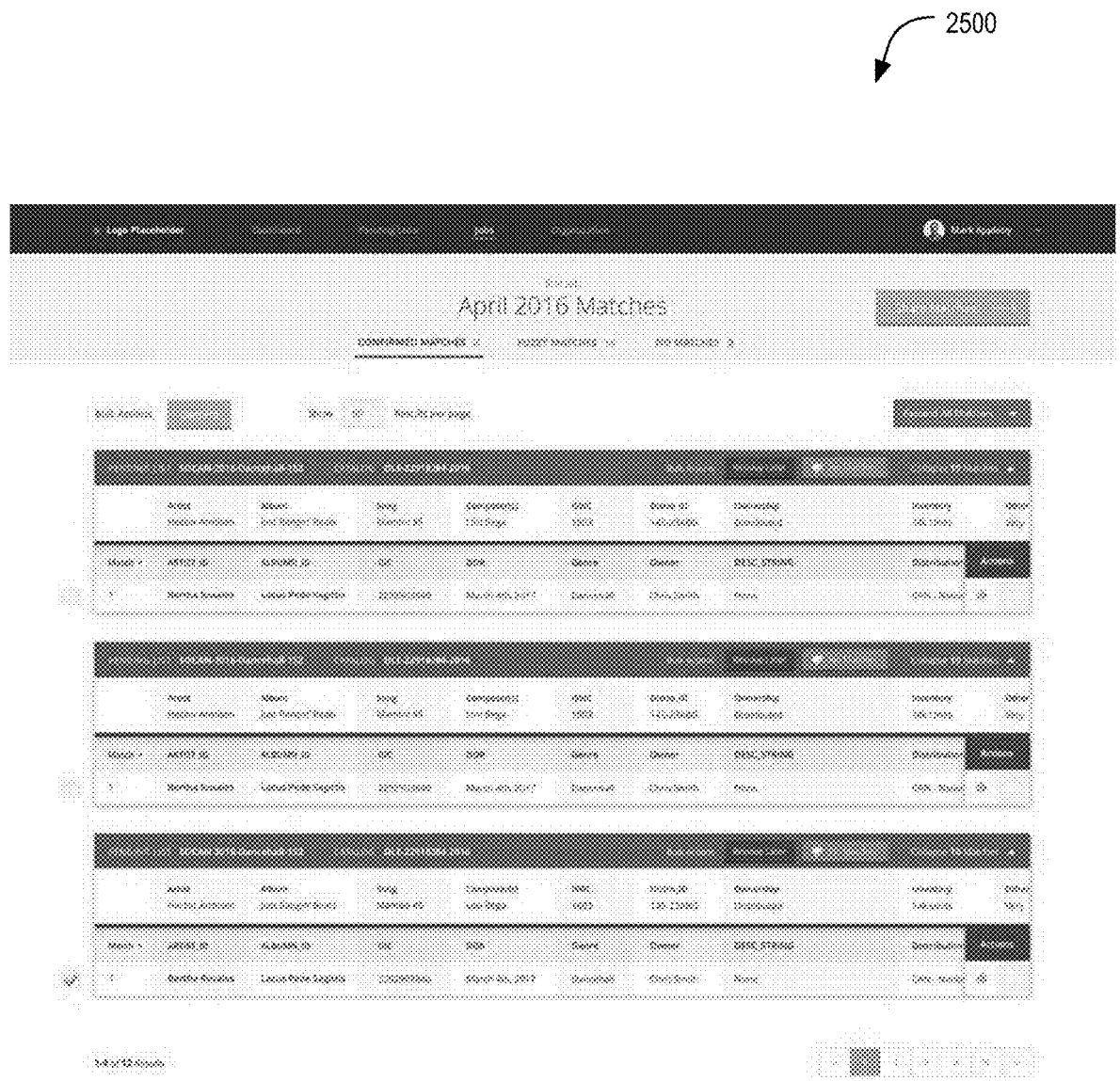
FIG. 25 is an example run job confirmed matches results interface according to the embodiment of the system and method for data comparison and sharing of FIG. 17.

Process 2100 begins at step 2104, in which a user can select to create a new job using button 2290 of interface 2200 of FIG. 22. At step 2108, the user can select one or more catalogs to be compared to one or more pending lists selected at step 2112. At step 2116, the user can construct a matching query for each pending list/catalog pair. FIG. 23 illustrates an example query-building interface 2300 associated with the process of step 2116. A test run on a subset of the data can be performed at step 2120 to ensure that the results are satisfactory as shown in the example test results interface 2400 of FIG. 24. If the results are not satisfactory, at step 2124 the user can revisit the constructor and revise the query. Once the test results are satisfactory at step 2120, at step 2128 the job can be started on the entire data sets as shown in interface 2500 of FIG. 25. This job can be started as a background process. The job can first attempt to make confirmed matches. Confirmed matches can include exact matches of the data fields in the selected query. Where the matches cannot be confirmed, an attempt can be made to match the asset with a fuzzy match. Fuzzy matching looks for similarly named assets, based on a normalized prefix of the data.

Figure 26:
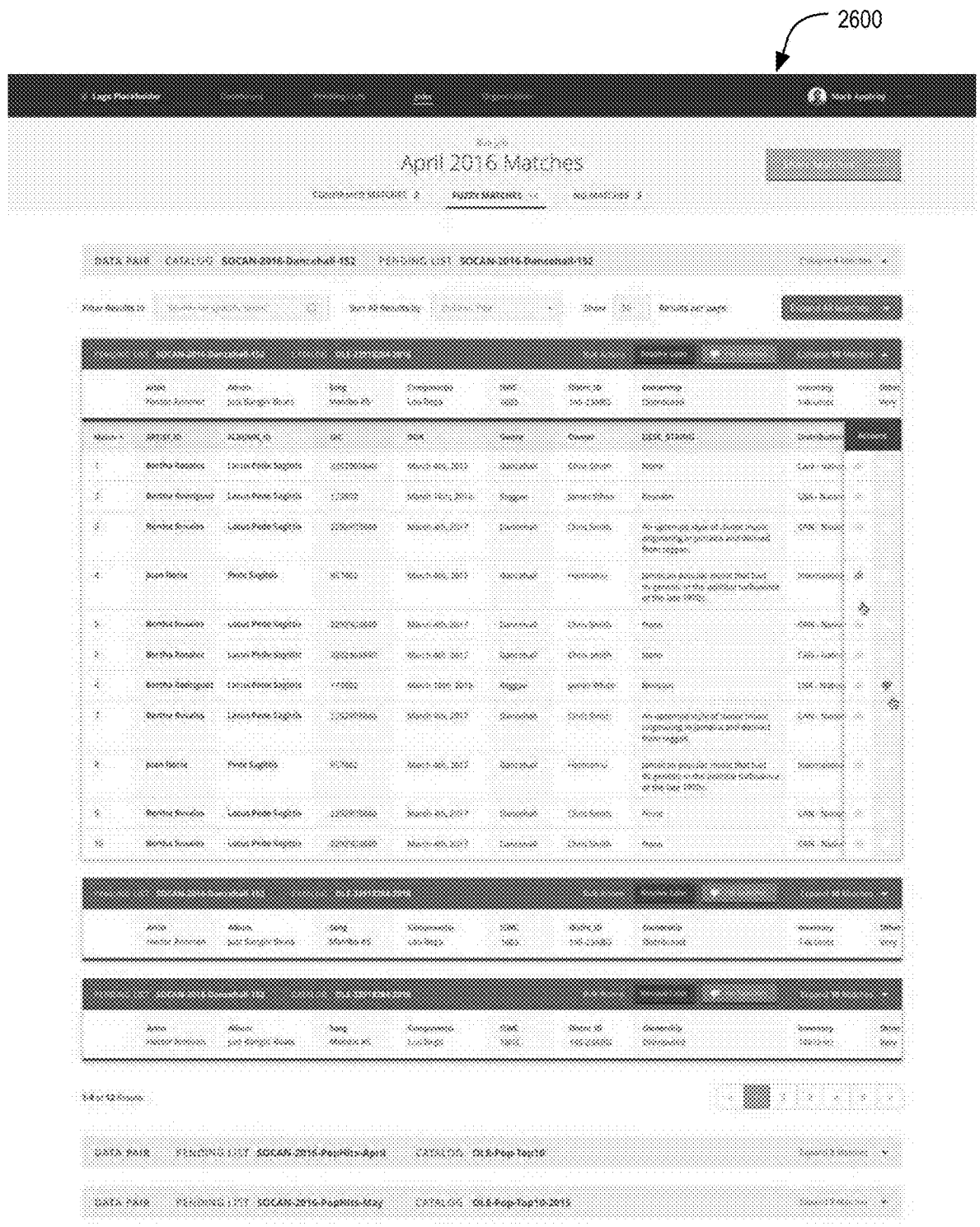
FIG. 26 is an example run job fuzzy matches results interface according to the embodiment of the system and method for data comparison and sharing of FIG. 17.

At step 2132 the user can be notified by a browser notification or email when the job is complete. If the user is notified by email, the user may retrieve the job results at step 2136. For example, the completion email can provide a link to the job results, which the user may open using a web browser. The full results can be provided at step 2140 using a results interface 2600 as shown in FIG. 26.

Figure 27:
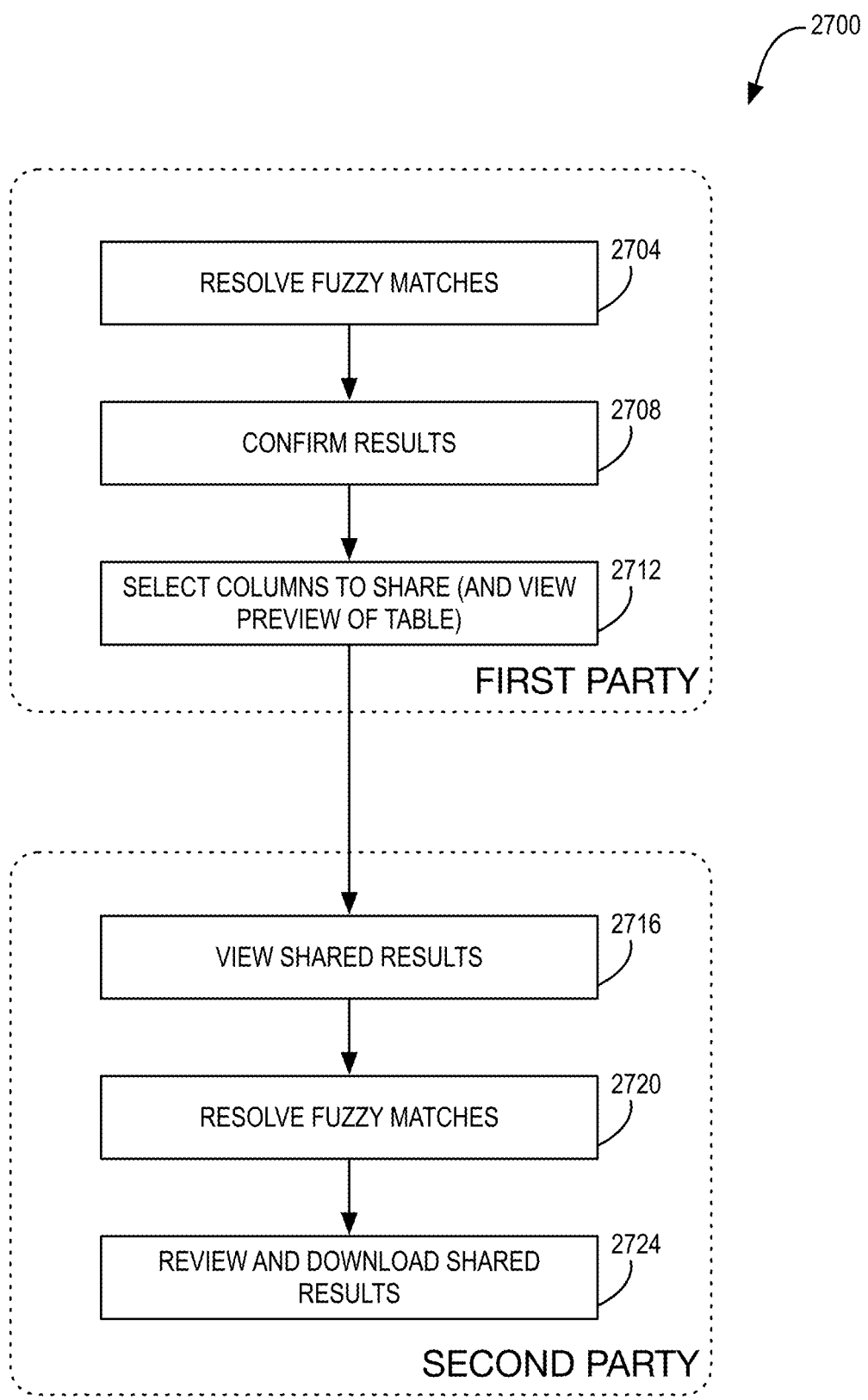
FIG. 27 is a process flow diagram depicting the results sharing process according to the embodiment of the system and method for data comparison and sharing of FIG. 17.

FIG. 27 depicts a process flow diagram for a results sharing process 2700, which corresponds generally to results sharing process 1600 described with reference to FIG. 16.

Process 2700 may begin once a user has received the full results, to allow the user to review the results. In particular, at step 2704, the user can review the matches that were identified as fuzzy matches and can manually confirm whether or not the fuzzy matches represent the same data. The user can confirm the results at step 2708 and at step 2712 the user can select which columns to share and can, optionally, view a preview of the table to share. In the example of FIG. 27, the first party is a Catalog Owner and the second party is a pending list host. Once the results are shared, the receiving user can receive a share notification at step 2716 which can include a link to the shared results. The receiving user can also review the fuzzy matches at step 2720 and can download the reviewed results at step 2724.

Figure 28:
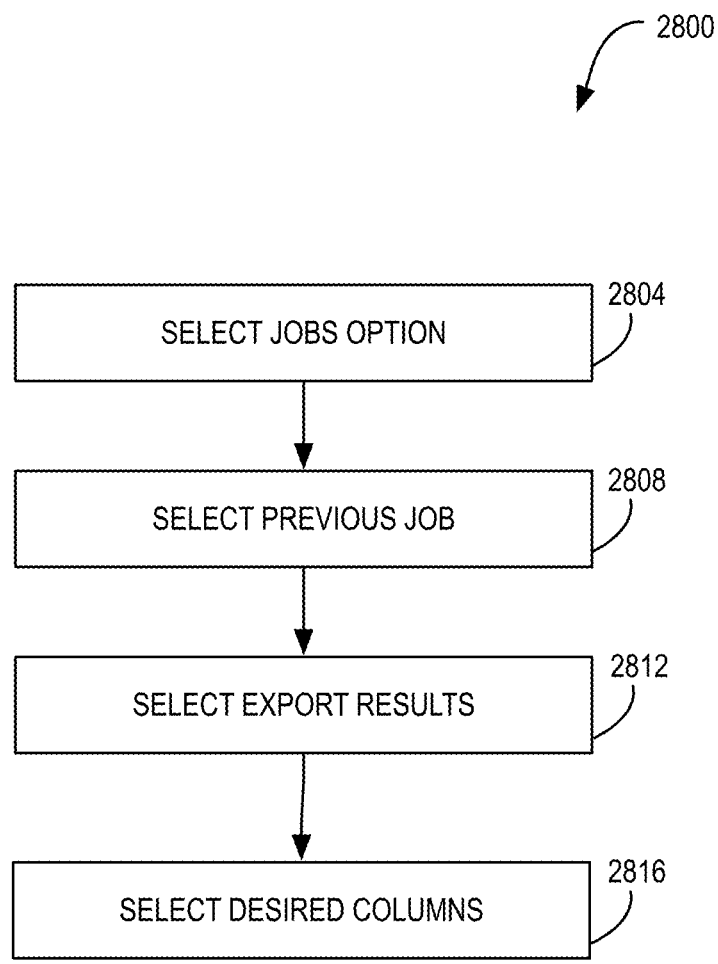
FIG. 28 is a process flow diagram depicting the results export process according to the embodiment of the system and method for data comparison and sharing of FIG. 17.
Figure 29:
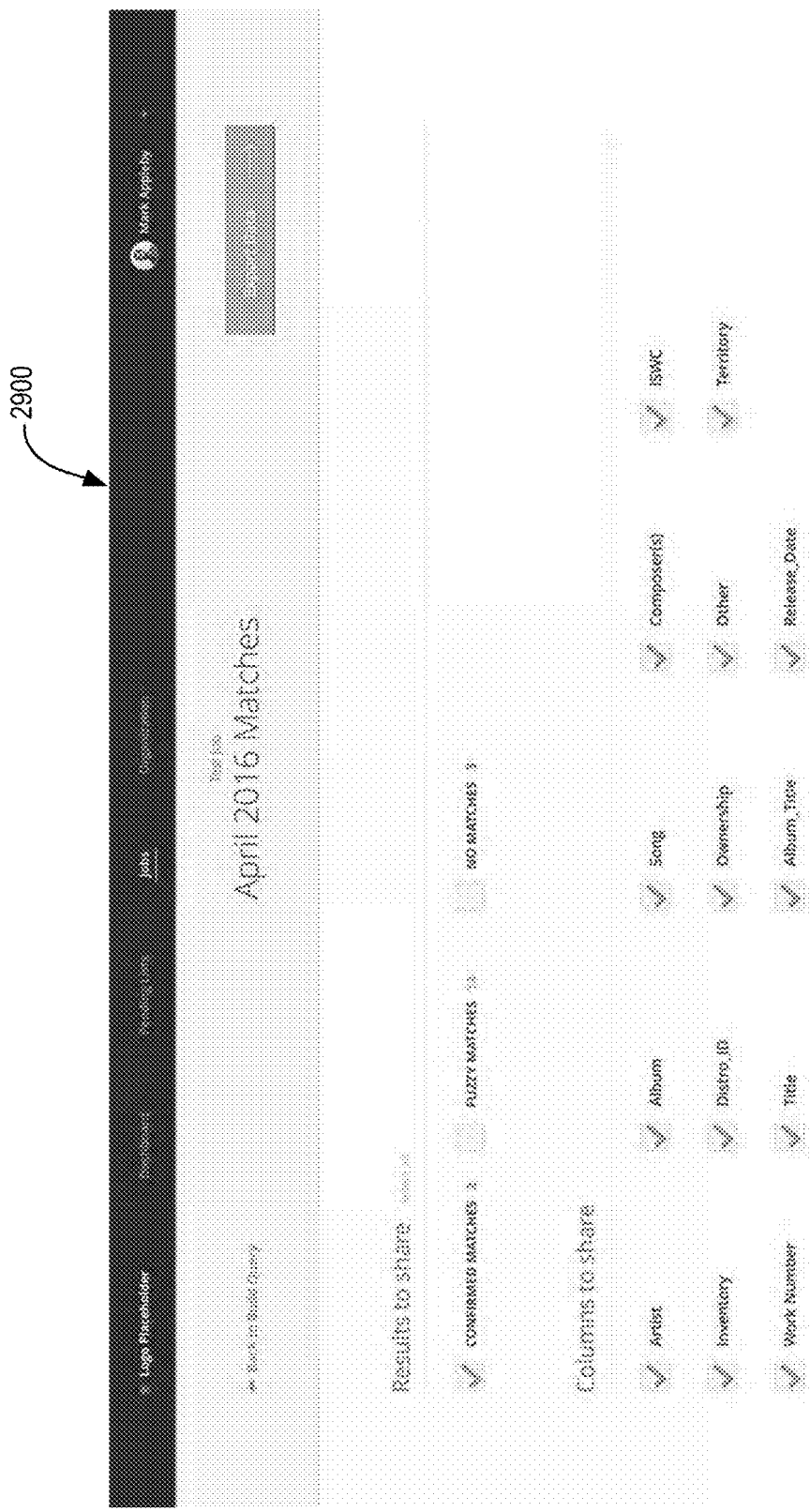
FIG. 29 is an example export results selection interface according to the embodiment of the system and method for data comparison and sharing of FIG. 17.

FIG. 28 depicts an example process flow diagram for a results export process 2800. A user can select the "Jobs" selection at step 2804 and select a previously run job at step 2808. An export option can be selected at step 2812 and at step 2816 the user can select any columns or results groups, such as confirmed results, fuzzy results or rejected results to be exported as shown in FIG. 29. As described above, in some embodiments the rejected or "no" results will be masked, and therefore not visible to the user to protect the privacy and security of the data.

Figure 32:
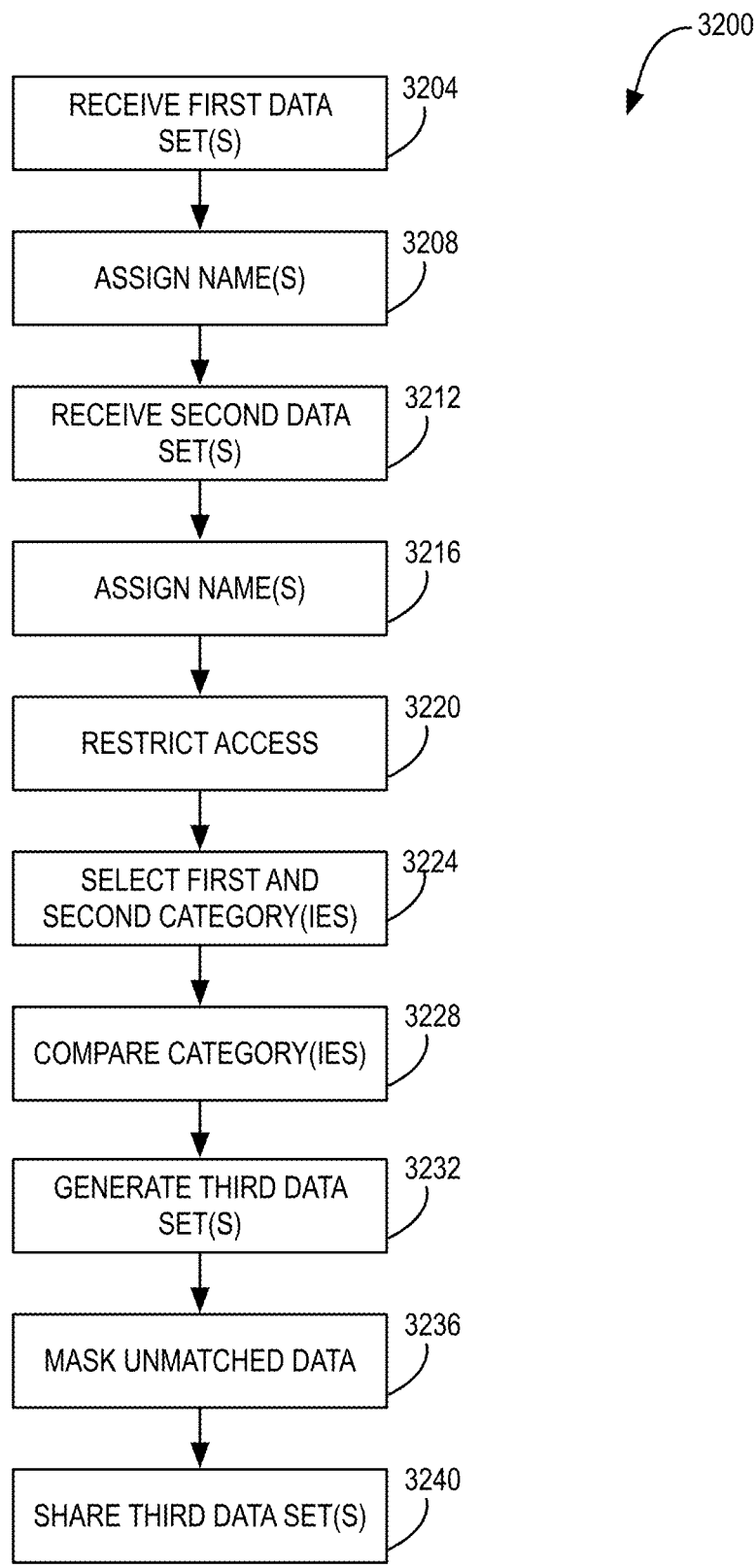
FIG. 32 is a process flow diagram for a method of managing data comparison and sharing in accordance with another example embodiment.

Referring now to FIG. 32, there is illustrated a process flow diagram for an example method of managing data comparison and sharing, in accordance with at least some embodiments. Process 3200 may be carried out by system 3000 of FIG. 30, for example.

Process 3200 begins at 3204 with the host system (e.g., one of the catalog owner device, pending list owner device and host device), receiving at least one first data set, each first data set comprising at least one first data category (e, the first data set being associated with a first organization, the first organization associated with at least one first user. The first data set or sets may be pending lists in the case that the first organization is a pending list owner; alternatively the first data set or sets may be catalogs in the cases that the first organization is a catalog owner. The first data category or categories may be columns in the data (e.g., artist name, title, etc.).

At 3208, the host system assigns a name to each of the at least one first data category of each first data set.

At 3212, the host system receive at least one second data set, each second data set comprising at least one second data category, the second data set being associated with a second organization the second organization associated with at least one second user. As above, the second data set or sets may be catalogs in the cases that the second organization is a catalog owner; alternatively the second data set or sets may be pending lists in the case that the second organization is a pending list owner. The second data category or categories may be columns in the data (e.g., artist name, title, etc.), although these need not correspond exactly with the first data category or categories.

At 3216, the host system assigns a name to each of the at least one second data category of each second data set.

At 3220, the host system restricts access to the at least one first data set to the at least one first user and restricts access to the at least one second data set to the at least one second user. For example, the host system may assign access permissions to the first data set limiting access to the at least one first user, and may assign access permissions to the second data set limiting access to the at least one second user.

At 3224, a selection of at least one first data category and selecting at least one second data category may be received, e.g., from one or more of the first or second users.

At 3228, the host system compares the at least one first data set with the at least one second data set based on the selected at least one first data category and the selected at least one second data category. If literal string matching fails to produce a positive result for a subset of the first data set and/or second data set, a "fuzzy logic" comparison may be used to generate additional results. For example, the host system may additionally compare a subset of the at least one first data set with a subset of the at least one second data set based on the selected at least one first data category and the selected at least one second data category using fuzzy logic.

At 3232, the host system generate at least one third data set based on the results of the comparison of the at least one first data set with the at least one second data set at 3228 (e.g., based on the selected at least one first data category and the selected at least one second data category).

At 3236, the host system masks unmatched data from the comparison of the at least one first data set with the at least one second data set based on the selected at least one first data category and the selected at least one second data category step, such that the masked data is excluded from the at least one third data set. In some embodiments, steps 3232 and 3236 may be performed in a single step.

At 3240, the host system may share the at least one third data set with at least one of the at least one first user or the at least one second user.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The invention claimed is:

1. A method for managing data comparison and sharing, the method comprising the steps of:
   receiving at least one first data set, each first data set comprising at least one first data category, the first data set being associated with a first organization, the first organization associated with at least one first user;
   assigning a name to each of the at least one first data category of each first data set;
   receiving at least one second data set, each second data set comprising at least one second data category, the second data set being associated with a second organization the second organization associated with at least one second user;
   assigning a name to each of the at least one second data category of each second data set;
   restricting access to the at least one first data set to the at least one first user and restricting access to the at least one second data set to the at least one second user;
   selecting at least one first data category and selecting at least one second data category:
   comparing the at least one first data set with the at least one second data set based on the selected at least one first data category and the selected at least one second data category, the comparison using fuzzy logic;
   generating at least one third data set comprising results of the comparison of the at least one first data set with the at least one second data set based on the selected at least one first data category and the selected at least one second data category; and
   sharing the at least one third data set with at least one of the at least one first user or the at least one second user.

2. The method according to claim 1, wherein unmatched data from the comparison of the at least one first data set with the at least one second data set based on the selected at least one first data category and the selected at least one second data category step is excluded from the at least one third data set.

3. The method according to claim 1, further comprising the step of comparing a subset of the at least one first data set with a subset of the at least one second data set based on the selected at least one first data category and the selected at least one second data category using fuzzy logic.

4. A system for managing data comparison and sharing, the system comprising:
   a computing device configured to:
      receive at least one first data set, each first data set comprising at least one first data category, the first data set being associated with a first organization, the first organization associated with at least one first user;
      assign a name to each of the at least one first data category of each first data set;
      receive at least one second data set, each second data set comprising at least one second data category, the second data set being associated with a second organization the second organization associated with at least one second user;
      assign a name to each of the at least one second data category of each second data set;
      restrict access to the at least one first data set to the at least one first user and restricting access to the at least one second data set to the at least one second user;
      select at least one first data category and selecting at least one second data category;
      compare the at least one first data set with the at least one second data set based on the selected at least one first data category and the selected at least one second data category, the comparison using fuzzy logic;
      generate at least one third data set comprising results of the comparison of the at least one first data set with the at least one second data set based on the selected at least one first data category and the selected at least one second data category; and
      share the at least one third data set with at least one of the at least one first user or the at least one second user.

5. The system according to claim 4, wherein unmatched data from the comparison of the at least one first data set with the at least one second data set based on the selected at least one first data category and the selected at least one second data category step is excluded from the at least one third data set.

6. The system according to claim 4, wherein the computing device is further configured to compare a subset of the at least one first data set with a subset of the at least one second data set based on the selected at least one first data category and the selected at least one second data category using fuzzy logic.

\* \* \* \* \*